United States Patent
Choi et al.

(10) Patent No.: US 8,666,064 B2
(45) Date of Patent: Mar. 4, 2014

(54) ENDECRYPTOR CAPABLE OF PERFORMING PARALLEL PROCESSING AND ENCRYPTION/DECRYPTION METHOD THEREOF

(75) Inventors: Hong-Mook Choi, Bucheon-si (KR); Jisoo Kim, Yongin-si (KR); Xingguang Feng, Yongin-si (KR); Woo-Hyun Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 336 days.

(21) Appl. No.: 12/874,799

(22) Filed: Sep. 2, 2010

(65) Prior Publication Data

US 2011/0123020 A1    May 26, 2011

(30) Foreign Application Priority Data

Nov. 26, 2009  (KR) .................. 10-2009-0115412

(51) Int. Cl.
*H04L 9/00* (2006.01)
*H04L 9/28* (2006.01)
*H04L 9/32* (2006.01)
*H04K 1/04* (2006.01)
*H04K 1/00* (2006.01)

(52) U.S. Cl.
USPC ............. 380/28; 380/29; 380/37; 380/259

(58) Field of Classification Search
USPC .................................. 380/28, 29, 259, 37
See application file for complete search history.

(56) References Cited

U.S. PATENT DOCUMENTS

| | | | | |
|---|---|---|---|---|
| 4,731,843 A | * | 3/1988 | Holmquist | 380/29 |
| 8,068,610 B2 | * | 11/2011 | Moroney et al. | 380/277 |
| 8,155,308 B1 | * | 4/2012 | Poo et al. | 380/29 |
| 2003/0016820 A1 | * | 1/2003 | Volpert, Jr. | 380/37 |
| 2004/0131186 A1 | * | 7/2004 | Kasuya et al. | 380/255 |
| 2006/0078107 A1 | * | 4/2006 | Lee | 380/28 |
| 2007/0003060 A1 | * | 1/2007 | Lee | 380/259 |
| 2012/0069993 A1 | * | 3/2012 | Fujisaki | 380/28 |

FOREIGN PATENT DOCUMENTS

| | | |
|---|---|---|
| JP | 2004-38103 | 2/2004 |
| KR | 2003-0083326 | 10/2003 |
| KR | 10-2008-0073348 | 8/2008 |
| WO | 2007/060587 | 5/2007 |

OTHER PUBLICATIONS

Liskov, Moses, Ronald L. Rivest, and David Wagner. "Tweakable block ciphers." Advances in Cryptology—CRYPTO 2002. Springer Berlin Heidelberg, 2002. 31-46.*
Martin, Luther. "XTS: A mode of AES for encrypting hard disks." Security & Privacy, IEEE 8.3 (2010): 68-69.*
IEEE Computer Society, "IEEE Standard for Cryptographic Protection of Data on Block-Oriented Storage Devices", IEEE Std 1619-2007, Apr. 18, 2008.

* cited by examiner

*Primary Examiner* — Luu Pham
*Assistant Examiner* — Kari Schmidt
(74) *Attorney, Agent, or Firm* — Onello & Mello LLP

(57) ABSTRACT

An encryption/decryption method of an endecryptor including a plurality of endecryption units supporting an XES mode with tweak and ciphertext streaming (XTS) includes dividing an input data stream into consecutive data units; inputting the divided data units to the endecryption units, respectively; and simultaneously processing the input data units at the respective endecryption units. According to the encryption/decryption method, parallel processing is performed to encrypt/decrypt data at higher speed.

18 Claims, 19 Drawing Sheets

ENDECRYPTOR CAPABLE OF PERFORMING PARALLEL PROCESSING AND ENCRYPTION/DECRYPTION METHOD THEREOF

CROSS-REFERENCE TO RELATED APPLICATIONS

This U.S. non-provisional patent application claims priority under 35 U.S.C. §119 to Korean Patent Application No. 10-2009-0115412, filed in the Korean Intellectual Property Office on Nov. 26, 2009, the entirety of which is hereby incorporated by reference.

BACKGROUND

1. Technical Field

The present inventive concept herein relates to an endecryptor capable of performing parallel processing and an endecryption method thereof.

2. Description of Related Art

Encryption technologies are frequently used to ensure security of data transmission. In an encryption technology, plaintext is encrypted at a transmission side, and ciphertext is decrypted at a receiving side. Encryption of plaintext and decryption of ciphertext are well-known aspects of encryption technologies.

One type of encryption protocol is the block cipher. On a data network, an encryption device uses a block cipher to secure data and various modes of operation in which practical encryption is performed using the block cipher.

Generally, the block cipher is a symmetric key cipher operating on fixed-length groups of bits, called blocks, with an unvarying transformation. A block cipher encryption approach might take, for example, a 128-bit block of plaintext as input and output a corresponding 128-bit block of ciphertext. The exact transformation is controlled using a second input, the secret key. Decryption is similar; the decryption algorithm takes, in this example, a 128-bit block of ciphertext together with the secret key, and yields the original 128-bit block of plaintext.

The data encryption standard (DES) is a block cipher protocol adopted as the standard in many countries and by the American National Standards Institute (ANSI). Additional standards include the triple-data encryption standard (3-DES) and the advanced encryption standard (AES). DES has been superseded as a United States Federal Standard by the AES.

A generalized version of block ciphers, referred to as "tweakable" block ciphers, has been developed. A tweakable block cipher accepts a second input called the "tweak" along with its usual plaintext or ciphertext input. The tweak, along with the key, selects the permutation computed by the cipher. Changing tweaks is generally less expensive than key setup operations, resulting in some new modes becoming possible.

Generally, block ciphers operate on blocks of fixed length. However, messages may be of any length and therefore must be broken into blocks before encryption. However, encrypting the same block under the same key produces the same output, and encrypting each block in isolation is inadequate for confidentiality. As a result, block cipher modes of operation were developed to address this problem.

In the block cipher protocol, various modes of operation are defined. These modes include electronic codebook (ECB), cipher block chaining (CBC), output feedback (OFB), cipher feedback (CFB), XOR-encrypt-XOR (XEX), and XEX encryption mode with tweak and ciphertext stealing (XTS). Ciphertext stealing is a technique of altering processing of the last two blocks of plaintext, resulting in a reordered transmission of the last to blocks of ciphertext and no ciphertext expansion. This is accomplished by padding the last plaintext block, which is possibly incomplete, with the high-order bits from the second to last ciphertext block, i.e., "stealing" the ciphertext from the second to last block. The resulting full last block is encrypted and then exchanged with the second to last ciphertext block, which is then truncated to the length of the final plaintext block, removing the bits that were "stolen," resulting in ciphertext of the same length as the original message size. The processing of all but the last two blocks in unchanged.

It should be noted that the terms "endecryptor" and "endecryption" used herein refer to a device and/or process which are capable of performing encryption and/or decryption.

SUMMARY

According to one aspect, the present inventive concept is directed to an encryption/decryption method of an endecryptor, the endecryptor including a plurality of endecryption units supporting an XTS encryption mode, the XTS encryption mode being an XOR-encrypt-XOR (XEX) encryption mode with tweak and ciphertext stealing. The method includes: dividing an input data stream into a plurality of consecutive data units; inputting the divided data units to the endecryption units, respectively; and simultaneously processing the input data units at the respective endecryption units.

In one embodiment, the endecryption units receive data units of a predetermined size. In one embodiment, a last data unit and a data unit preceding the last data unit among the consecutive data units are encrypted/decrypted using ciphertext stealing (CTS) when the data stream cannot be divided evenly by the predetermined size. In one embodiment, when the CTS occurs, the last data unit is input to an encryption unit at which the data unit preceding the last data unit is processed.

In one embodiment, the endecryptor inputs the consecutive data units to the endecryption units in a parallel processing mode, respectively.

In one embodiment, the endecryptor inputs the consecutive data units to one of the endecryption units in a mode that is not a parallel processing mode. In one embodiment, each of the endecryption units uses a block cipher protocol. In one embodiment, the block cipher protocol is the advanced encryption standard (AES) protocol. In one embodiment, simultaneously processing the input data units at the respective endecryption units comprises: encrypting a tweak value according to a second input key and the block cipher protocol; performing modular multiplication of the encrypted tweak value by a primitive value; performing an exclusive OR (XOR) operation on a result value of the modular multiplication and an input data unit; processing a result value of the XOR operation according to a first input key and the block cipher protocol; and performing an XOR operation on the result value of the modular multiplication and the processed result value of the XOR operation. In one embodiment, the tweak value is any bit having the same size as data to be processed at the endecryption units. In one embodiment, the primitive value is determined by an exponent corresponding to the sequential number of the consecutive data units. In one embodiment, the modular multiplication of the primitive value is performed by a shift or XOR operation.

According to another aspect, the present inventive concept is directed to an endecryptor comprising: a plurality of endecryption units supporting an XTS encryption mode, the XTS encryption mode being an XOR-encrypt-XOR (XEX)

encryption mode with tweak and ciphertext stealing; a divider configured to divide a data stream into consecutive data units; and an allocator configured to allocate the divided data units to the endecryption units, respectively, and to input the allocated data units to the endecryption units. Each of the endecryption units simultaneously processes the input data units.

In one embodiment, the allocator simultaneously inputs the allocated data units to the endecryption units during one processing period in a parallel processing mode.

In one embodiment, each of the endecryption units performs an endecryption operation according to a block cipher protocol by the unit of 128 bits. In one embodiment, a remainder obtained by dividing bytes of the data stream by 16 is used to determine whether ciphertext stealing (CTS) occurs. In one embodiment, a value obtained by dividing bytes of the data stream by 16 is subjected to a floor operation when ciphertext stealing (CTS) does not occur, and a remainder obtained by dividing a value obtained by subtracting 1 from a value obtained through the floor operation by the number of the endecryption units is used to determine an endecryption unit where the last one of the consecutive data units is to be processed. In one embodiment, when the CTS does not occur, a value obtained by dividing the bytes of the data stream by a value obtained by multiplying the number of the endecryption units by 16 is subjected to a ceiling operation to determine a parallel processing count of the endecryption units. In one embodiment, when the CTS occurs, a value obtained by dividing a value obtained by subtracting 16 from bytes of the data stream by a value obtained by multiplying the number of the endecryption units by 16 is used to determine a parallel processing count of the endecryption units. In one embodiment, the block cipher protocol is the advanced encryption standard (AES) protocol.

BRIEF DESCRIPTION OF THE DRAWINGS

The present inventive concept will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present inventive concept.

DETAILED DESCRIPTION OF THE EMBODIMENTS

The present inventive concept will now be described more fully hereinafter with reference to the accompanying drawings, in which preferred embodiments of the present inventive concept are shown.

Note that "exclusive OR" is referred to herein as "XOR".

Figure 1:
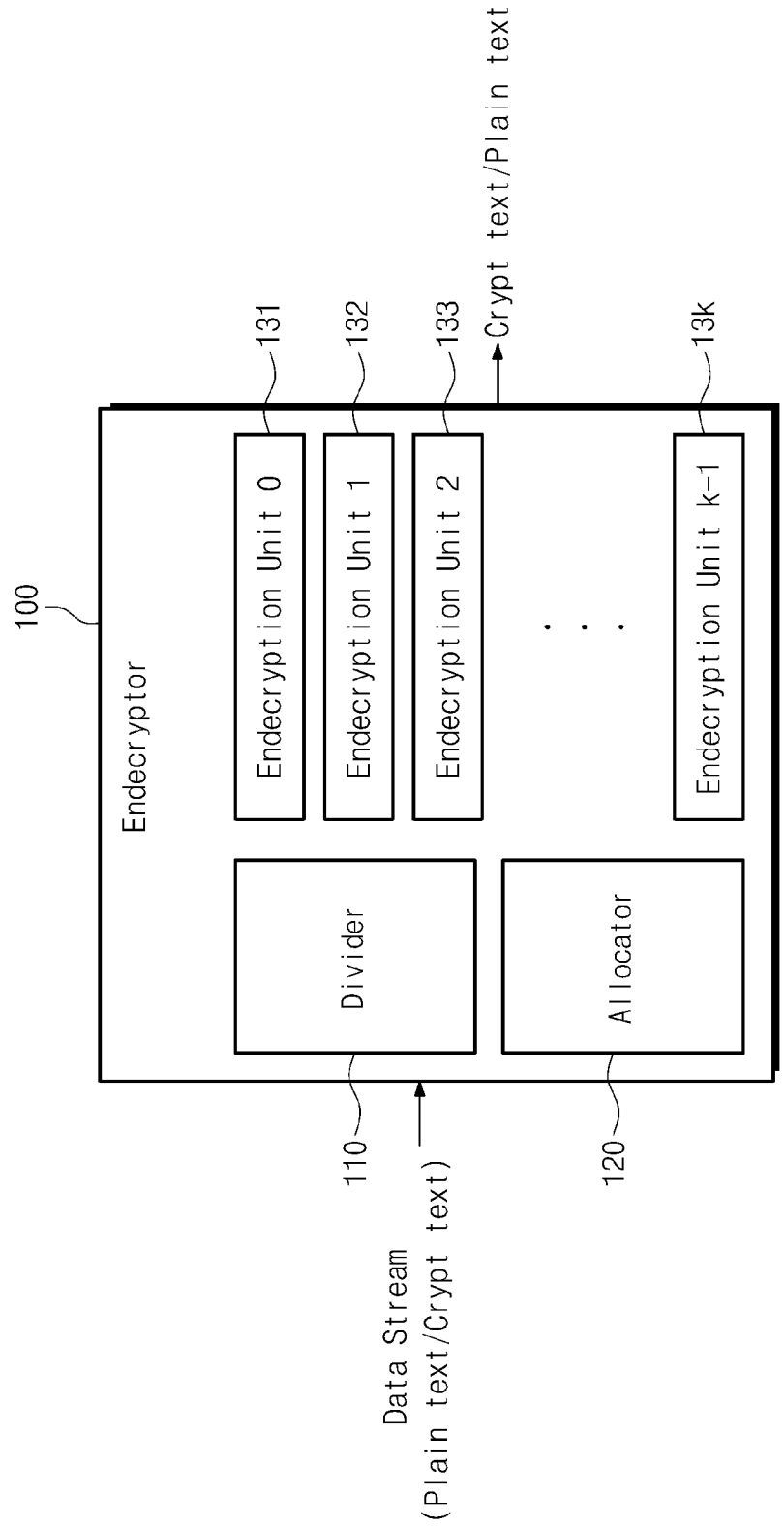
FIG. 1 illustrates an endecryptor according to an embodiment of the present inventive concept.

FIG. 1 illustrates an endecryptor 100 according to an embodiment of the present inventive concept. As illustrated, the endecryptor 100 may include a divider 110, an allocator 120, and a plurality of endecryption units 131, 132, ..., 13$k$. The endecryptor 100 may operate the endecryption units 131, 132, ..., 13$k$ in parallel to encrypt/decrypt an input data stream. When the input data stream is plaintext, an encryption operation may be performed through a parallel process to output ciphertext. When the input data stream is ciphertext, a decryption operation may be performed through a parallel process to output plaintext.

The endecryptor 100 may perform an endecryption operation for more than one of the endecryption units 131, 132, ..., 13$k$ simultaneously in a parallel processing operation, which will be referred to as a "parallel processing mode" hereinbelow. However, the endecryptor 100 is not limited to performing the endecryption operation in a parallel processing mode. The endecryptor 100 may perform an endecryption operation for only one of the endecryption units 131, 132, ..., 13$k$, which will be referred to as a "serial processing mode" hereinbelow.

The divider 110 may divide the data stream input to the endecryptor 100 into consecutive data units of the same size (e.g., 128 bits). A sequential number may correspond to each of the consecutive data units. When the size of the data stream is not a multiple of the size of the data units, the last one of the consecutive data units may comprise only original bits.

The allocator 120 may allocate the endecryption units 131, 132, ..., 13$k$ for processing the respective data units divided at the divider 110 and input corresponding data units to the allocated endecryption units 131, 132, ..., 13$k$. For instance, the consecutive data units may be sequentially allocated to the endecryption units 131, 132, ..., 13$k$, respectively.

When the size of the data stream is not a multiple of the size of a data unit, the allocator 120 may allocate the last one of the consecutive data units to an endecryption unit to which a data unit preceding the last data unit is allocated. However, the present inventive concept is not limited to that configuration.

Alternatively, the allocator 120 may allocate the last one of the consecutive data units to one of the endecryption units other than an endecryption unit to which a data unit preceding the last data unit is allocated.

Each of the endecryption units 131, 132, . . . , 13k may encrypt/decrypt input data units using a encryption protocol. In this case, the endecryption units 131, 132, . . . , 13k may receive and process data of the same size.

An encryption protocol used in the respective endecryption units 131, 132, . . . , 13k may include the data encryption standard (DES) protocol, the 3-DES protocol, and/or the advanced encryption standard (AES) protocol. The encryption protocol of the endecryption units 131, 132, . . . , 13k may operate in various operation modes such as electronic codebook (ECB), cipher block chaining (CBC), output feedback (OFB), cipher feedback (CFB), XOR-encrypt-XOR (XEX), and XEX encryption mode with tweak and ciphertext stealing (XTX).

For the convenience of description, it is assumed herein that an encryption protocol is AES and an operation mode is XTX. The AES is a block cipher protocol where the length of a key is variable. For instance, the length of a key can be 128, 192, or 256 bits. For the convenience of description, it is assumed herein that the length of data processed in a cipher protocol is 128 bits and a padding operation is performed when input data is less than 128 bits. The padding operation converts the input data into data of 128 bits to perform a decryption operation.

Each of the endecryption units 131, 132, . . . , 13k may be configured using a single chip. Alternatively, the endecryption units 131, 132, . . . , 13k may be configured using a more than a single chip.

The endecryptor 100 according to the present inventive concept may include a plurality of endecryption units 131, 132, . . . , 13k to process the data stream (plaintext or ciphertext) in parallel. Thus, the endecryptor 100 may perform a parallel processing operation during an encryption or decryption operation. As a result, the endecryptor 100 may perform an encryption/decryption operation at high speed.

Figure 2:
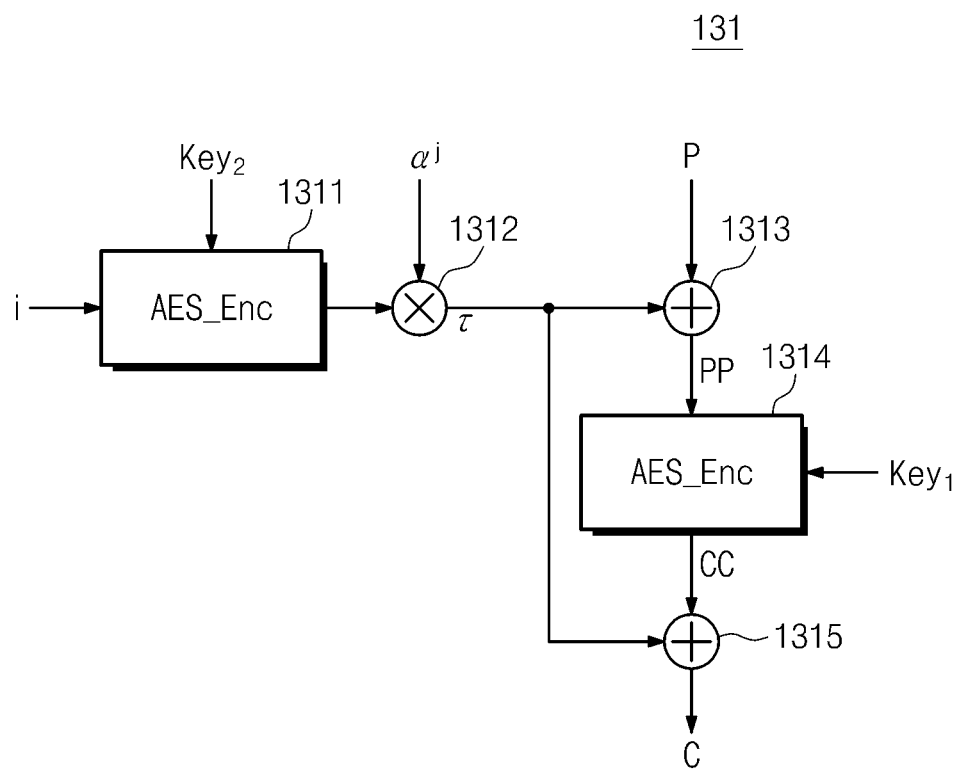
FIG. 2 illustrates an encryption procedure of one of the endecryption units shown in FIG. 1.

FIG. 2 illustrates an encryption procedure of one of the endecryption units 131, 132, 133, . . . , 13k shown in FIG. 1. Referring to FIG. 2, the endecryption unit 131 may include a first encryption data unit 1311, a modular multiplier 1312, a first XOR operator 1313, a second encryption data unit 1314, and a second XOR operator 1315. A data unit encryption procedure according to the present inventive concept will be described below in detail.

The first encryption data unit 1311 may encrypt a tweak value i by means of a second input key Key2 and an AES encryption protocol. The tweak value i may be 128 bits. The tweak value i may be stored in an internal register of the endecryptor (100 in FIG. 1) during an encryption operation.

The modular multiplier 1312 performs modular multiplication for a value encrypted at the first encryption data unit 1311 according to a primitive value $\alpha^j$, wherein $\alpha$ represents a primitive element of a binary field and j represents an exponent which is a sequential number of data units. That is, the number of consecutively divided data units may be the value of j.

The first XOR operator 1313 may perform a bit-wise XOR operation on an output value τ of the modular multiplier 1312 and a plaintext input P. In this exemplary embodiment, the plaintext input P is a data unit of 128 bits.

The second encryption data unit 1314 may encrypt a result value PP of the first XOR operator 1313 by means of a first input key Key1 and an AES encryption protocol.

The second XOR operation 1315 may perform a bit-wise XOR operation on an encryption value CC output of the second encryption data unit 1314 and a modular multiplication result value τ. Thus, a ciphertext C is output. In this case, the size of the ciphertext C is 128 bits.

In an encryption procedure of a data unit where the size of data to be encrypted is 128 bits or more, the foregoing operations may be repeated. In this case, modular multiplication according to the primitive value $\alpha^j$ may be updated whenever an operation for the respective data units is performed.

A procedure of modular multiplication calculation according to a primitive element $\alpha$ will be described below. An input is a byte array $a_0[k]$ (k=0, 1, . . . , 15) and an output is a byte array $a_j[k]$ (k=0, 1, . . . , 15), wherein j represents an exponent of the primitive element $\alpha$. The output may be repeated from i=0 to i=j and repeatedly defined by an equation [Equation 1] as follows:

$$\alpha_{i-1}[0] \leftarrow (2(\alpha_i[0] \bmod 128)) \oplus (135\lfloor\alpha_i[15]128\rfloor)$$

$$\alpha_{i-1}[k] \leftarrow (2(\alpha_i[k] \bmod 128)) \oplus \lfloor\alpha_i[15-1]128\rfloor,$$
$$k=1, 2, \ldots, 15 \qquad \text{[Equation 1]}$$

Figure 3:
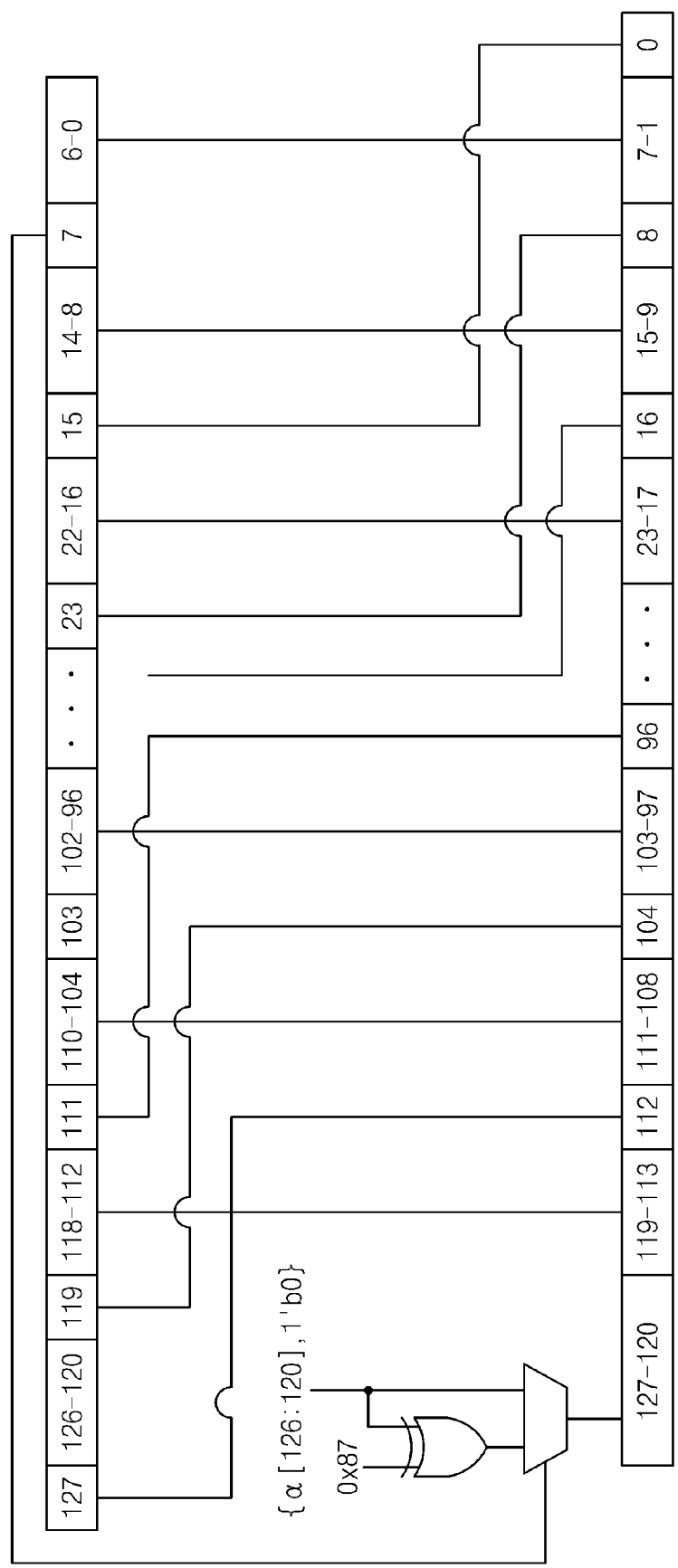
FIG. 3 illustrates a modular multiplication procedure according to a primitive element in an equation 1 set forth herein.

FIG. 3 illustrates a modular multiplication procedure according to the primitive element a in Equation 1. It is assumed that 127, 126~120, 119, 118~112, . . . , 7, 6~0, 127~120, 119~113, 112, . . . , 7~1, 0 are values of a modular multiplication result according to a primitive value $\alpha^j$. As set forth above, a modular multiplication operation according to a primitive element $\alpha$ may be performed by a shift and XOR operation. Such a procedure may be repeated to perform a modular multiplication operation according to $\alpha^1, \alpha^2, \alpha^3, \alpha^4 \ldots, \alpha^{m-1}, \alpha^m$.

When the data stream to be updated is data of 128 bits or more, a modular multiplication operation according to the primitive element $\alpha$ according to the foregoing update procedure may be repeatedly performed, and a result value of the modular multiplication operation may be used in an encryption operation.

On the other hand, when the data stream to be encrypted is not a multiple of 128 bits, i.e., cannot be divided by 128 bits, the last data unit and a data unit preceding, for example, immediately preceding, the last data unit may be encrypted using ciphertext stealing (hereinafter referred to as "CTS").

Figure 4:
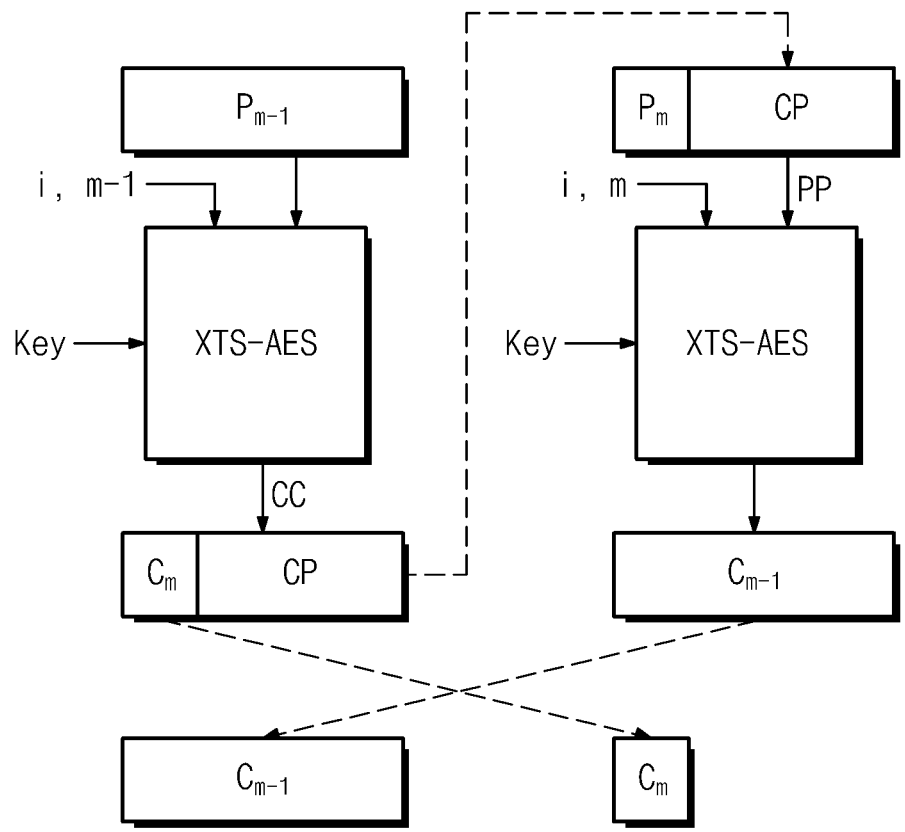
FIG. 4 is a block diagram illustrating an encryption procedure using CTS in an endecryption unit according to the present inventive concept.

FIG. 4 is a block diagram illustrating an encryption procedure using CTS in an endecryption unit according to the present inventive concept. At this point, the last data unit to be encrypted is 1 to 27 bits. In FIG. 4, i and m represent modular multiplication according to $\alpha^m$ and Key represents a consecutive value of a first key (Key1 in FIG. 2). Referring to FIG. 4, padding of two data units Pm−1 and Pm and position of encryption operation results Cm−1 and Cm may be varied during an encryption operation.

A data unit encryption value CC of the data unit Pm−1 preceding the last data unit Pm may include a first encryption area Cm and a second encryption area CP.

The first encryption area Cm may have the same bit as the last data unit Pm. At this point, the first encryption area Cm may be output as an encryption result value of the last data unit Pm.

The last data unit Pm may be encrypted in the unit of data by adding a partial area, i.e., the second encryption area CP in the encrypted value CC of the preceding data unit Pm−1. A data-unit-encrypted value Cm−1 may be output as an encryption result value of the preceding data unit Pm−1.

Figure 5:
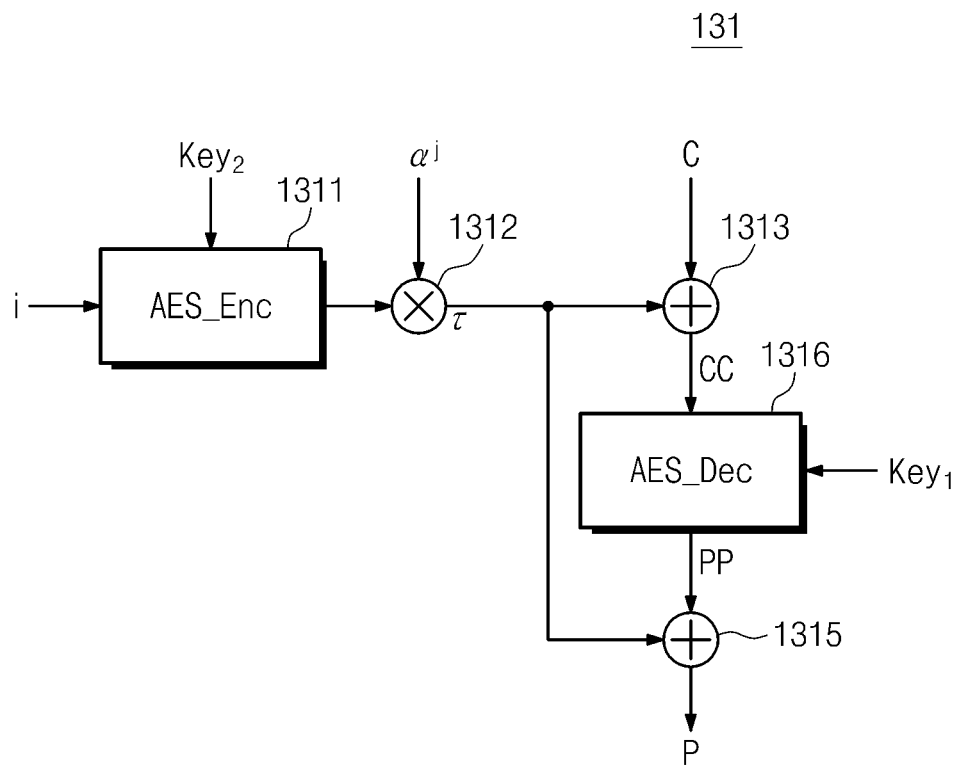
FIG. 5 illustrates a decryption procedure of one of the endecryption units shown in FIG. 1.

FIG. 5 illustrates a decryption procedure of one of the endecryption units shown in FIG. 1.

Referring to FIG. 5, the first encryption data unit 1311 may encrypt a tweak value i according to a second input key Key2 and an AES encryption protocol.

The modular multiplier 1312 may perform a modular multiplication operation for a value encrypted at the first encryption data unit 1311 according to a primitive value $\alpha^j$. The first XOR operator 1313 may perform a bit-wise XOR operation on an output value τ of the modular multiplier 1312 and a ciphertext C. A first decryption data unit 1316 may decrypt a result value CC of the first XOR operator 1313 according to a first input key Key1 and AES encryption protocol. A second XOR operator 1315 may perform a bit-wise XOR operation on a decryption value PP of the first decryption data unit 1316 and the modular multiplication result value τ. Thus, plaintext P is output.

In an encryption procedure for a data unit where data stream to be decrypted is 128 bits or more, the foregoing operations may be repeated. In this case, modular multiplication according to the primitive value $\alpha^j$ may be updated whenever an operation for respective data units is performed.

When the data stream to be decrypted is not a multiple of 128 bits, i.e., cannot be divided into 128 bits, a decryption operation may be performed at the two last data units by using CTS.

Figure 6:
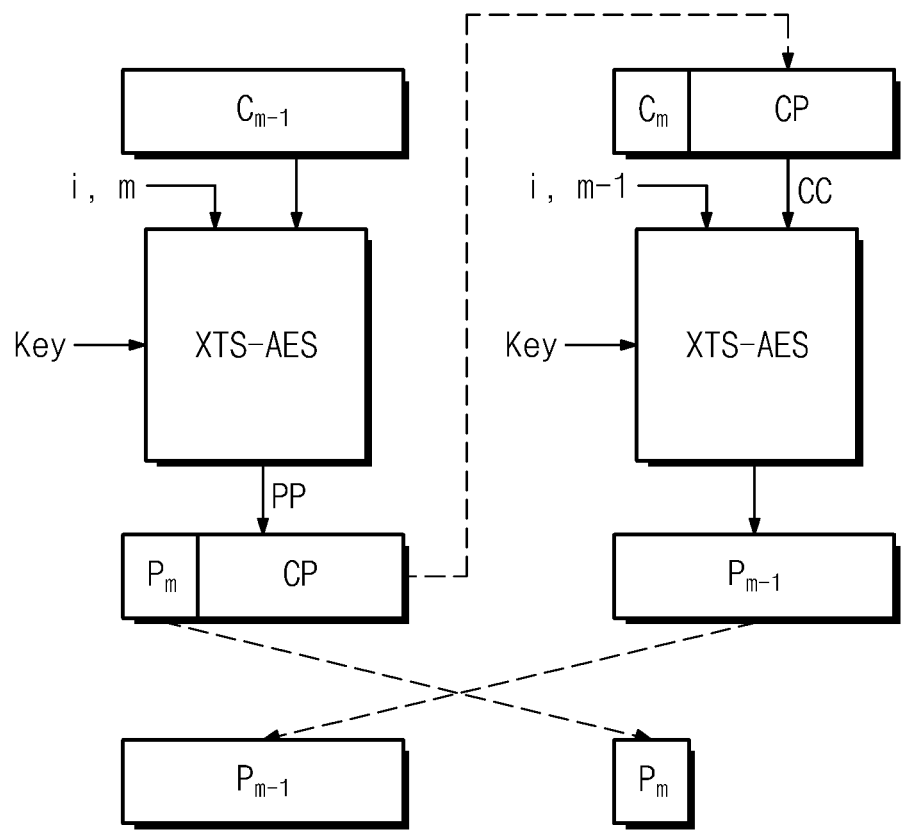
FIG. 6 is a block diagram illustrating a decryption procedure using CTS in an endecryption unit according to the present inventive concept.

FIG. 6 is a block diagram illustrating a decryption procedure using CTS in an endecryption unit according to the present inventive concept. Referring to FIG. 6, padding of two data units Cm−1 and Cm and position of decryption operation result values Pm−1 and Pm may be varied.

A data unit decryption value PP of the data unit Cm−1 preceding the last data unit Cm may include a first decryption area Pm and a second decryption area CP. The first decryption area Pm may have the same bit as the last data unit Cm. At this point, the first decryption area Pm may be output as a decryption result value of the last data unit Cm.

The last data unit Cm may be decrypted in the unit of data by adding a partial area, i.e., the second decryption area CP in the decrypted value PP of the preceding data unit Cm−1. A data-unit-encrypted value Pm−1 may be output as a decryption result value of the preceding data unit Cm−1. Thus, a decryption operation using CTS is completed.

Figure 7:
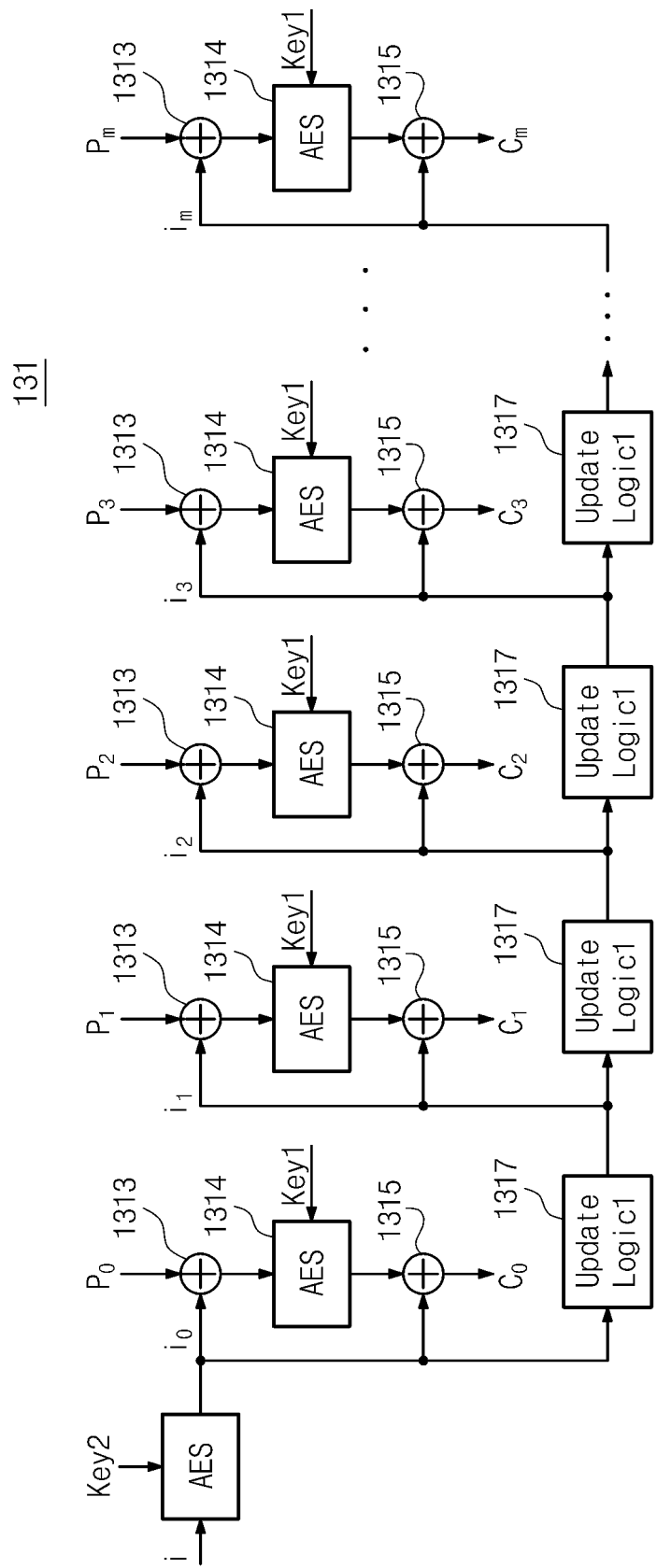
FIG. 7 illustrates a procedure of encryption performed in a serial processing mode at the endecryptor shown in FIG. 1.

FIG. 7 illustrates a procedure of encryption performed in a serial processing mode at the endecryptor 100 shown in FIG. 1. For the convenience of description, it will be assumed that an encryption operation is performed at a first encryption unit 131 of the plurality of encryption units 131, 132, . . . , 13k.

Consecutive data units P0, P1, . . . , Pm−1, Pm for data stream may be sequentially input to the endecryption unit 131. Thus, the endecryption unit 131 may encrypt the respective input data units P0, P1, . . . , Pm−1, Pm according to first and second keys Key1 and Key2, a primitive value $\alpha^j$ updated by an update logic 1317, and AES encryption protocol to output ciphertexts C0, C1, . . . , Cm−1, Cm.

Figure 8:
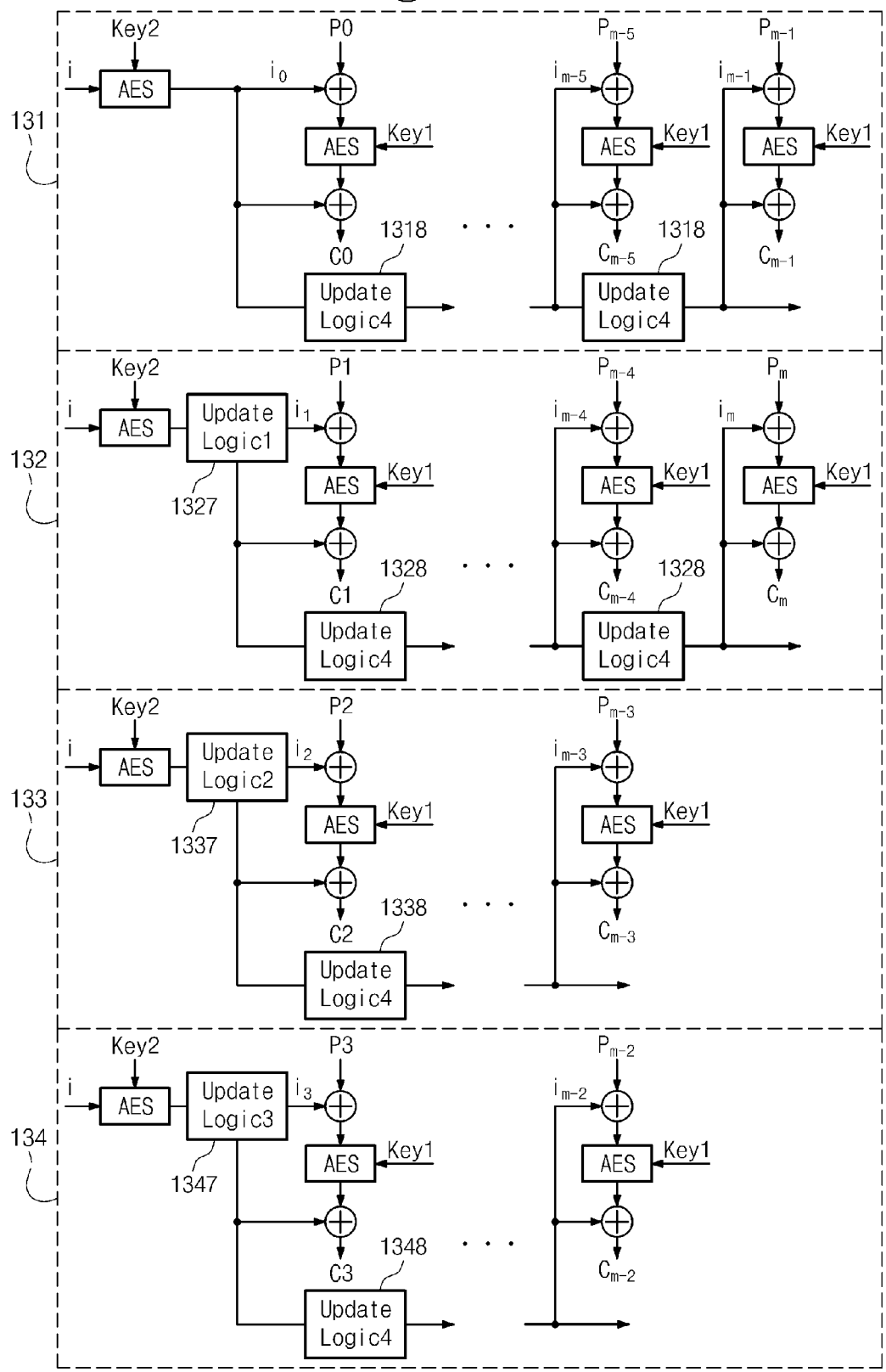
FIG. 8 illustrates a procedure of encryption performed in a parallel processing mode at the endecryptor shown in FIG. 1 when CTS does not occur.

FIG. 8 illustrates a procedure of encryption performed in a parallel processing mode at the endecryptor 100 shown in FIG. 1 when CTS does not occur. Referring to FIG. 8, a plurality of endecryption units 131, 132, 133, and 134 may perform an encryption operation in parallel. For the convenience of description, it is assumed that the number of endecryption units is four and the number m of overall data units is 4k+2 (k being zero or a positive integer). However, the number of encryption units according to the present inventive concept is not limited to four. The number of endecryption units according to the present inventive concept may at least two.

The process of modular multiplication according to the primitive element α is important for parallel processing in the XTS mode of the endecryptor 100. In the parallel processing mode, values such as 128-bit data units (plaintext/ciphertext), a key and a tweak value i may be simultaneously input to a plurality of endecryption units as predetermined values. However, a modular multiplication value according to the primitive element α is not a predetermined value and is continuously updated depending on an encryption operation. For this reason, the modular multiplication value may be calculated in advance, and the calculated value is used in the respective endecryption units 131, 132, 133, and 134.

A parallel processing procedure using the four endecryption units 131, 132, 133, and 134 will now be described. Returning to FIG. 7, plaintexts $P_0 \sim P_3$ may be simultaneously input and encrypted at the four endecryption units 131, 132, 133, and 134, respectively. Next, plaintexts $P_4 \sim P_7$ may be simultaneously input and encrypted at the four endecryption units 131, 132, 133, and 134, respectively.

Update logics 1318, 1327, 1328, 1337, 1338, 1347, 1348 may be used to calculate a modular multiplication value in advance or perform continuous update.

When a plaintext data stream is processed in parallel in the endecryption units 131, 132, 133, and 134 to obtain the same result as when the data stream is encrypted in an endecryption unit, a modular multiplication value according to a primitive element α is calculated in advance. Update logics 1318, 1327, 1328, 1337, 1338, 1347, and 1348 included in the endecryption units 131, 132, 133, and 134 may operate modular multiplication values in advance. The update logics 1318, 1327, 1328, 1337, 1338, 1347, and 1348 may perform operations as described below.

The update logic 1318 of the first endecryption unit 131 may perform a modular multiplication operation procedure according to the primitive element α four times. The update logic 1327 of the second endecryption unit 132 may perform a modular multiplication operation procedure according to the primitive element α once. The update logic 1328 of the second endecryption unit 132 may perform a modular multiplication operation procedure according to the primitive element α four times. The update logic 1337 of the third endecryption unit 133 may perform a modular multiplication operation procedure according to the primitive element α twice. The update logic 1338 of the third endecryption unit 133 may perform a modular multiplication operation procedure according to the primitive element α four times. The update logic 1347 of the fourth endecryption unit 134 may perform a modular multiplication operation procedure according to the primitive element a three times. The update logic 1348 of the fourth endecryption unit 134 may perform a modular multiplication operation procedure according to the primitive element a four times.

The update logics 1318, 1327, 1328, 1337, 1338, 1347, and 1348 may comprise shift or XOR operations to be performed in advance. That is, the update logics 1318, 1327, 1328, 1337, 1338, 1347, and 1348 may be configured using a shift logic performing a shift operation or a logic circuit performing an XOR operation.

The endecryptor (100 in FIG. 1) according to the inventive concept may perform a modular multiplication procedure according to a primitive element α not only once but at least once (N times when N endecryption units are processed in parallel). A result value of the modular multiplication operation performed at least once may be selected depending on whether operation sequence ciphertext stealing (CTS) of endecryption units occurs, the operation sequence being a parallel processing sequence and being performed on first through Nth data units when there are N endecryption units).

Similar to, for instance, a multiplexer, one of a plurality of values (determined by the count of modular multiplications performed) may be selected, and an XTS mode operation may be performed using the selected value. When N endecryption units (N being an integer 2 or greater) are used, there may be selected any one of values obtained when a modular multiplication operation according to the primitive element α is not performed, a value obtained when the operation is performed once, a value obtained when the operation is performed twice, . . . , and a value obtained when the operation is performed N times.

The endecryptor 100 according to the present inventive concept may perform an encryption or decryption operation in a serial processing mode by means of an endecryption unit. Thus, the endecryptor 100 may be embodied to permit the setting of a parallel processing mode. The endecryptor 100 may calculate required modular multiplication values by means of the foregoing update logics when a parallel processing mode is set.

Figure 9:
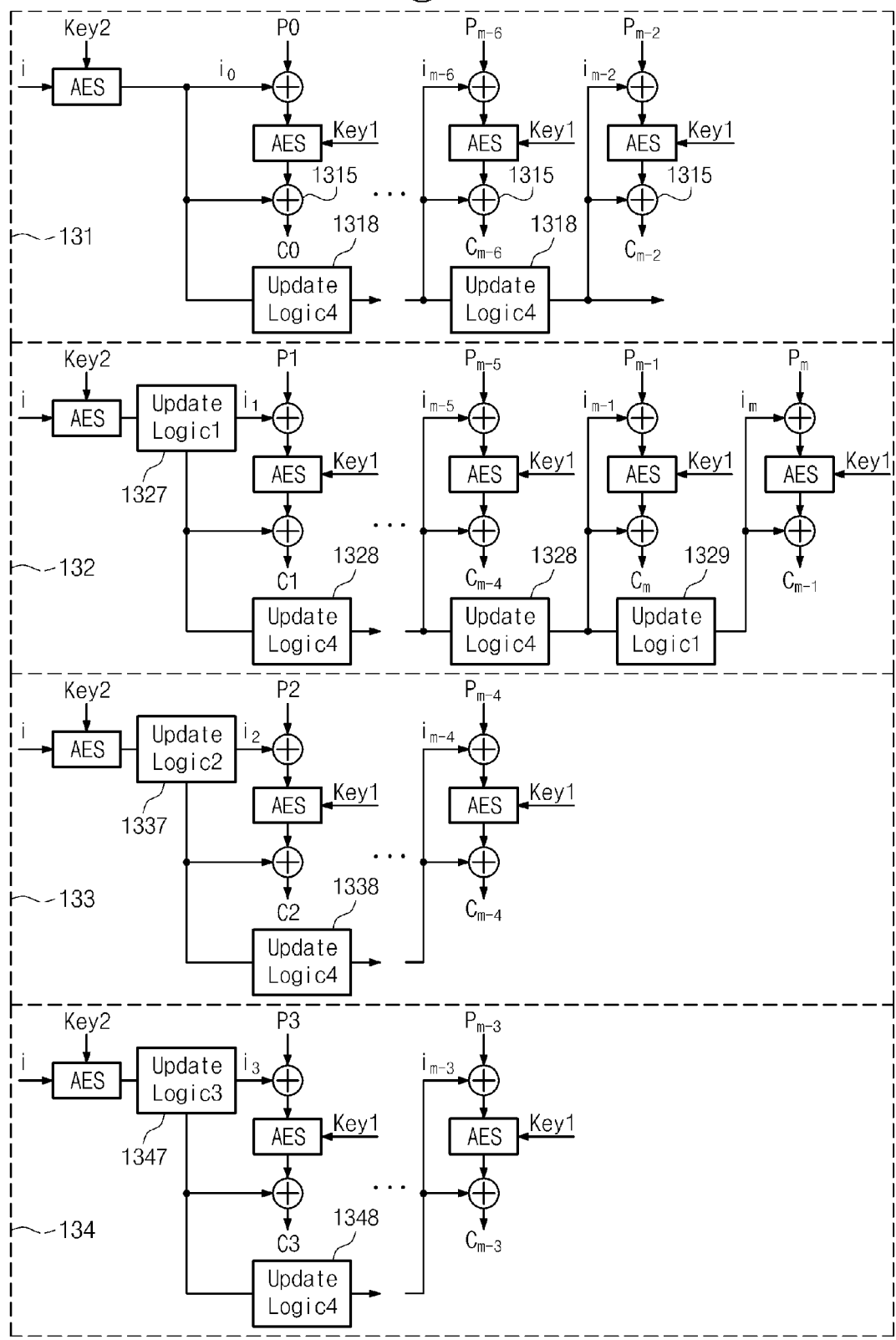
FIG. 9 illustrates a procedure of encryption performed in a parallel processing mode at the endecryptor shown in FIG. 1 when CTS occurs.

FIG. 9 illustrates a procedure of encryption performed in a parallel processing mode at the endecryptor 100 shown in FIG. 1 when CTS occurs. Referring to FIG. 9, the number m of all data units is 4k+3 (k being zero or a positive integer) and the last data unit Pm is 1 to 15 bytes.

In this example, the last data unit Pm is not 128 bits. Thus, CTS may occur during encryption of the last data unit Pm and a data unit Pm−1 preceding the last data unit Pm. When the CTS occurs, the last data unit Pm may be encrypted by an endecryption unit 132 where the data unit Pm−1 is to be processed. This is because CTS uses an operation result value of the preceding data unit Pm−1. For instance, as illustrated in FIG. 9, the encryption operation of the last data unit Pm may be performed at the second encryption unit 132 where the encryption result value for $P_{m-1}$ is obtained.

As illustrated in FIG. 9, when CTS occurs, the last data unit is processed at an endecryption unit where a data unit Pm−1 preceding the last data unit Pm is processed. However, the present inventive concept is not limited to that configuration. When CTS occurs, the last data unit may be processed at an endecryption unit other than an encryption unit where a data unit preceding the last data unit is processed. In this case, an encryption operation result of the data unit preceding the last data unit may be transmitted to another endecryption unit where the last data unit is to be processed.

Each of the endecryption units 131, 132, 133, and 134 may define a single core. As mentioned above, an XTS mode may operate at high speed by using a plurality of cores (endecryption units).

When a data unit is processed at a single core, a modular multiplication operation procedure according to a primitive element α is not performed once but may be performed many times depending on the number of cores. For example, in the case of parallel processing using four cores, a modular multiplication operation procedure according to a primitive element α may be performed maximally four times at the respective cores. Thus, the endecryptor 100 according to the present inventive concept may obtain the same result value as using a single core and improve performance.

A modular multiplication operation procedure according to a primitive element α may be performed at least once at respective cores used in a parallel processing mode. As set forth above, the modular multiplication operation procedure may be performed many times depending on the number of cores or whether CTS occurs.

Although an endecryptor and an encryption method have been described using XTS-AEC (XTS mode of AES) as an example, they may be applied to all types of block ciphers.

The endecryptor (100 in FIG. 1) according to the present inventive concept can operate through firmware installed and running on a programmable processing apparatus. The firmware may operate an XTS mode by setting a register of a hardware device.

In order to operate an XTS mode, the endecryptor 100 may include control registers for setting values. That is, values corresponding to a parallel processing mode, an encryption mode (ECB/CBC/CTR/XTS . . . ), a key mode (key size, 128/192/256 bits), encryption/decryption setting, a ciphertext stealing (CTS) mode, and/or CTS length may be set to the control registers.

Also the endecryptor 100 may include registers for setting other input data (e.g., plaintext and ciphertext), a key, an initialization vector (IV) value, a counter value, and a tweak value. Because the IV value, the counter value, and the tweak value are used differently depending on an encryption mode (i.e., are not used simultaneously), they may be simultaneously used by one register.

Setting a register of a hardware device though firmware for performing parallel processing in an XTS mode will now be described below.

Table 1 shows signals for XTS mode parallel processing at the endecryptor 100 according to the present inventive concept.

TABLE 1

| KIND OF SIGNAL | EXPLANATION | EXAMPLE OF USE |
| --- | --- | --- |
| Parallel Processing Mode | signal to select parallel processing mode | 0: not parallel processing<br>1: parallel processing |
| CTS | signal to inform whether CTS occurs | 0: CTS does not occur<br>1: CTS occurs |
| Length of Last Data Unit | signal to inform length of last data unit<br>(In case of 0, CTS does not occur)<br>(In case of the others, CTS occurs) | 0000: 0 byte<br>0001: 1 byte<br>0010: 2 bytes<br>0011: 3 bytes<br>0100: 4 bytes<br>0101: 5 bytes<br>0110: 6 bytes<br>0111: 7 bytes<br>1000: 8 bytes<br>1001: 9 bytes<br>1010: 10 bytes<br>1011: 11 bytes<br>1101: 12 bytes<br>1101: 13 bytes<br>1110: 14 bytes<br>1111: 15 bytes |

The endecryptor 100 may perform parallel processing in an XTS mode by using the respective signals shown in Table 1.

Referring to Table 1, there is only one parallel processing mode signal irrespective of the number of endecryption units. For instance, when a parallel processing mode signal is '0', parallel processing is not performed. When the parallel processing mode signal is '1', parallel processing is performed. According to another exemplary embodiment of the present inventive concept, each endecryption unit may receive a parallel processing mode signal. That is, the number of parallel processing mode signals is equal to that of endecryption units.

In addition, there is only one CTS signal irrespective of the number of endecryption units. For instance, when a CTS signal is '0', CTS does not occur. When the CTS signal is '1', CTS occurs.

In addition, there is only one last data unit length signal irrespective of the number of endecryption units. For instance, when a last data unit length signal is '0001', the length of the last data unit Pm is 1 byte. When the last data unit length signal is '1111', the length of the last data unit Pm is 15 bytes.

The endecryptor 100 according to the present inventive concept determines whether CTS occurs, a processing count, and an encryption unit where the last data unit is to be processed, which will now be described below. For the convenience of description, it is assumed that the length of data to be encrypted/decrypted is A bytes and the number of endecryption units is B.

Table 2 may be made based on an equation [Equation 2]. Table 2 shows determination of whether CTS occurs and an endecryption unit where the last data unit is to be processed.

[Equation 2]

$$A \% 16 \quad (1)$$

$$[(\lfloor A/16 \rfloor) - 1] \% B \quad (2)$$

$$\lceil A/(16 \times B) - \rceil \quad (3)$$

$$\lceil (A-16)/(16 \times B) \rceil \quad (4)$$

wherein '%' represents an operation symbol, '/' represents a division operation symbol, '⌊ ⌋' represents an operation symbol for performing floor to a near number, and '⌈ ⌉' represents an operation symbol for performing ceiling to a near number.

TABLE 2

| | $PC_1$ | $PC_2$ | ... | $PC_k$ |
|---|---|---|---|---|
| $G_0$ | | | | |
| $G_1$ | | | | |
| ... | | | | |
| $G_{B-1}$ | | | | |

In Equation 2, a vertical side denotes the number of endecryption units processed in parallel and a horizontal side denotes the process count (or parallel processing count).

In Equation 2, (1) shows whether CTS occurs and the length of the last data unit. For instance, in case of A %16=0, CTS does not occur because the endecryptor 100 performs an operation by the unit of 128 bits.

In Equation 2, (2) shows what group (endecryption unit) performs an operation of the last data unit (Pm in FIG. 8). The CTS may occur at a group according to a value of (2).

In Equation 2, (3) is used when the CTS does not occur and shows what times each group performs an operation by using the result value of (2). That is, the processing count (or parallel processing count) may be determined based on (3) of Equation 2. Thus, the processing count $PC_1 \sim PC_1$, may be determined, as shown in Table 2.

For instance, it is assumed that data to be encrypted/decrypted is 32 bytes (A) and two endecryption units (B) are used. Because 32% 16=0 when using (1) of Equation 2, CTS does not occur. Because [(⌊32/16⌋)−1]% 2=1 when using (2) of Equation 2, an operation of the last data unit is performed at the second group $G_1$. Because ⌈32/(16×2)⌉=1 when using (3) of Equation 2, the processing count is only one.

Since the processing count is only one, a column of $PC_1$ is selected and the operation of the last data unit is performed at a second group to select both $G_0$ and $G_1$. When obtained is the result that an operation of the last data unit is performed at a first group, only $G_0$ may be selected at the $PC_1$. According to the result, a table on parallel processing signals is made as below.

TABLE 3

| | $PC_1$ | $PC_2$ | ... | $PC_k$ |
|---|---|---|---|---|
| $G_0$ | operating | | | |
| $G_1$ | operating | | | |

As shown in Table 3, the endecryptor 100 may input data units corresponding to respective encryption units during an endecryption operation for data of 32 bytes. At this point, control signals other than the controls signals shown in Table 1 may be simultaneously input to two endecryption units, and the endecryptor 100 may be set to a parallel processing mode to perform parallel processing in an XTS mode.

On the other hand, when CTS occurs, the parallel processing count may be determined using (4) of Equation 2. When the CTS occurs, the last data unit of data to be encrypted/decrypted is not 16 bytes. At this point, the last data unit and a data unit preceding the last data unit may be processed at a group where the data unit preceding the last data unit is processed.

For instance, it is assumed that data to be encrypted/encrypted is 95 bytes (A) and three endecryption units (B) are used. Because 95%16=15 when using (1) of Equation 2, CTS may occur. Because [(⌊95/16⌋)−1]%3=1 when using (2) of Equation 2, an operation of the last data unit is performed at a second group $G_I$. Because ⌈(95−16)/(16×3)⌉=2 when using (4) of Equation 2, the parallel processing count is two. Since the parallel processing count is two, columns of $PC_1$ and $PC_2$ may be selected, and the operation of the last data unit may be performed at a second group. According to the result, a table (Table 4) on parallel processing signals is made as below.

TABLE 4

| | $PC_1$ | $PC_2$ | $PC_3$ | $PC_4$ | ... | $PC_k$ |
|---|---|---|---|---|---|---|
| $G_0$ | operating | operating | | | | |
| $G_1$ | operating | operating | operating | | | |
| $G_2$ | operating | | | | | |

Referring to Table 4, the parallel processing count is two and CTS occurs at a second group $G_1$.

Since the endecryptor 100 according to the present inventive concept performs parallel processing, it may set a parallel processing mode to '1'. Due to the occurrence of CTS, the endecryptor 100 may generate a CTS signal to indicate whether the CTS occurs. Also, the endecryptor 100 may generate a signal to indicate the length of the last data unit according to (1) of Equation 2 and input the generated signal to the group where the CTS occurs.

A parallel processing mode signal may be input to the overall endecryptor 100 comprising a plurality of endecryption units, and the other signals may be input only to an endecryption unit where an operation is to be performed using (1) to (4) of Equation 2. CTS and a last data unit length signal correspond to the case where the CTS occurs. Therefore, the last data unit length signal may be input only to an endecryption unit where the last data unit is processed. Since the CTS occurs at two data units, a CTS generation signal may be input to a processed group when a data unit preceding the last data unit is processed.

The last data unit length signal may be used in padding. Thus, the last data unit length signal may be input at the time of processing the last data unit or at the previous time. When the last data unit length signal is input at the previous time, it may be maintained at its value.

An update logic of the last data unit may determine what value is processed according to a CTS signal. For instance, as shown in FIG. 8, the last data unit may use an update logic 1329 to perform an update once. The update logic may perform an update procedure for a primitive element α once. Accordingly, the update logic may internally perform an update procedure using the CTS signal.

For instance, a data unit processed first at respective encryption units may determine an update logic according to the number of the endecryption units. As shown in FIG. 9, if there are four endecryption units 131, 132, 133, and 134, a first data unit processed at the encryption unit 131 corresponding to a first group Group0 may not use an update logic.

A second data unit processed at the second encryption unit 132 corresponding to a second group Group1 may use an update logic 1317, which is updated once. The last data unit processed at the second endecryption unit 132 corresponding to the second group Group1 may use an update logic 1329, which is updated once. As set forth above, an update logic may be determined according to the CTS signal and the number of the endecryption units.

When data of 520 bytes used, for example, in a solid-state drive (SSD) is input, the respective endecryption units may operate according to (1) and (4) of Equation 2.

A control signal is generated using (1) to (4) of Equation 2 to control respective endecryption units for use in parallel processing according to the length of data and the number of the endecryption units.

If an XTS mode is applied not to AES, but to an encryption protocol such as DES, 16 used in the equations of (1) to (4) may be changed to 8. This is because the DES encryption protocol is executed based on 64 bits (8 bytes).

Figure 10:
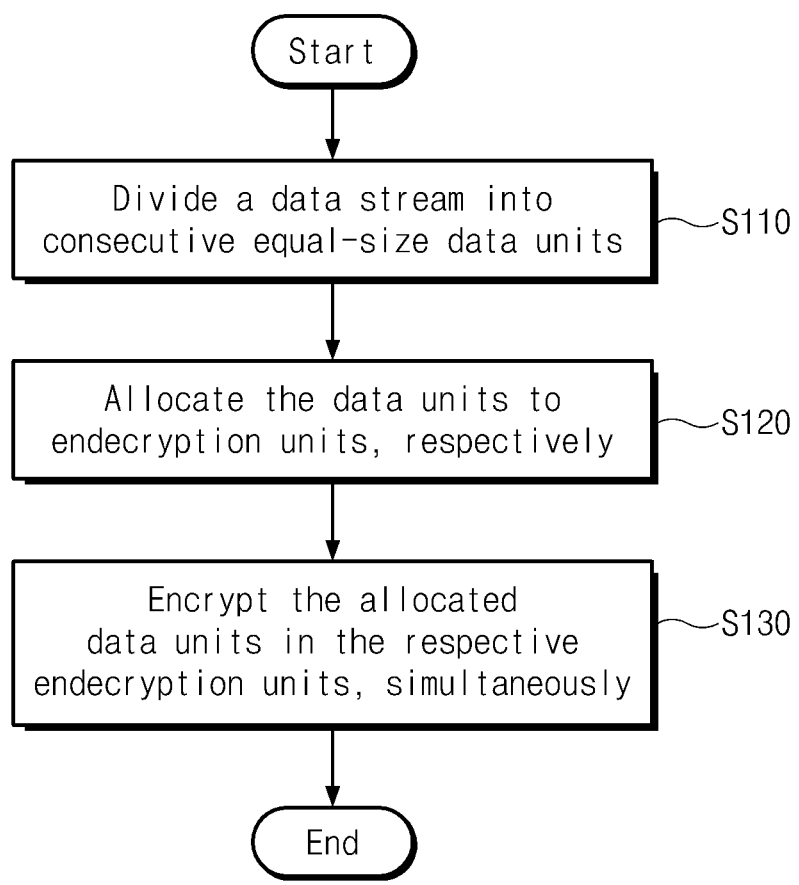
FIG. 10 is a flowchart illustrating an encryption procedure of an endecryptor according to the present inventive concept.

FIG. 10 is a flowchart illustrating an encryption procedure of an endecryptor 100 according to the present inventive concept. Referring to FIG. 10, an encryption procedure of the endecryptor 100 will now be described below in detail.

A divider (100 in FIG. 1) divides a data stream, which is an encryption target, into consecutive data units (S110) of generally equal size. An allocator (120 in FIG. 1) allocates endecryption units 131, 132, 133, . . . , 13$k$ for processing the divided data units and simultaneously inputs k data units to the endecryption units 131, 132, 133, . . . , 13$k$ during one processing period (S120). The input data units are simultaneously encrypted at the respective endecryption units 131, 132, 133, . . . , 13$k$ (S130). The S120 and 130 may be repeated according to the size of the data stream.

As described above, the encryption method according to the present inventive concept may include encrypting a data stream in parallel through a plurality of endecryption units.

Figure 11:
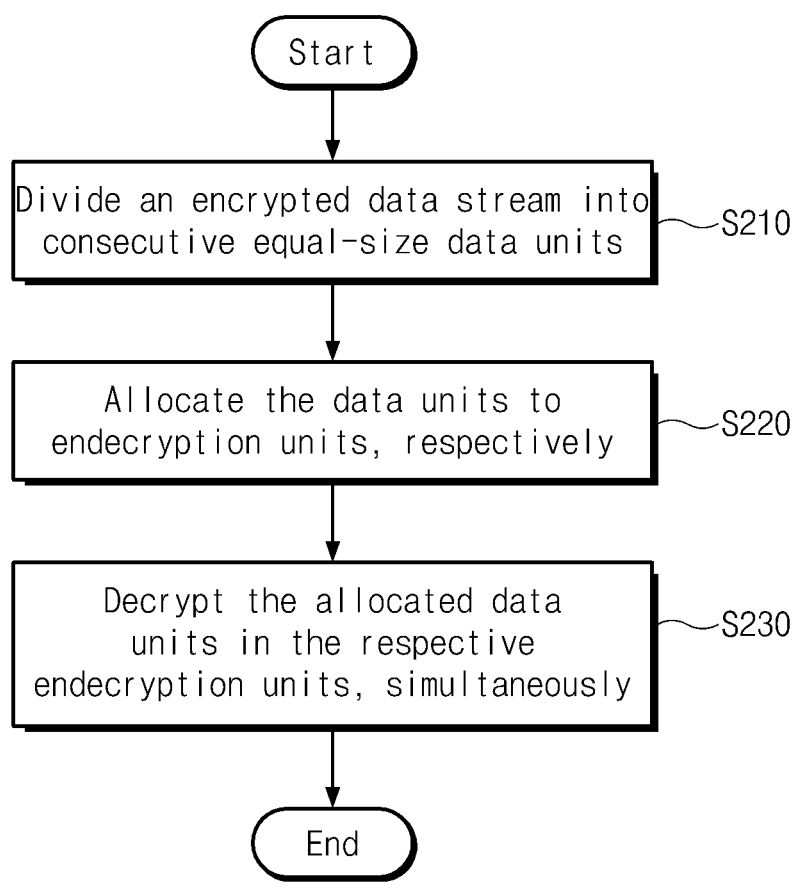
FIG. 11 is a flowchart illustrating a decryption procedure of an endecryptor according to the present inventive concept.

FIG. 11 is a flowchart illustrating a decryption procedure of an endecryptor according to the present inventive concept. Referring to FIG. 11, a decryption procedure of an encryptor (100 in FIG. 1) will now be described below in detail.

A divider (110 in FIG. 1) divides an encrypted data stream into consecutive data units (S210). An allocator (120 in FIG. 1) allocates endecryption units 131, 132, 133, . . . , 13$k$ for processing the divided data units and simultaneously inputs k data units to the endecryption units 131, 132, 133, . . . , 13$k$ during one processing period (S220). The allocated encrypted data units are simultaneously decrypted by the respective endecryption units 131, 132, 133, and 134 (S230). The S220 and 230 may be repeated according to the size of the data stream.

As set forth above, the encryption method according to the present inventive concept may include decrypting data stream in parallel through a plurality of endecryption units.

Figure 12:
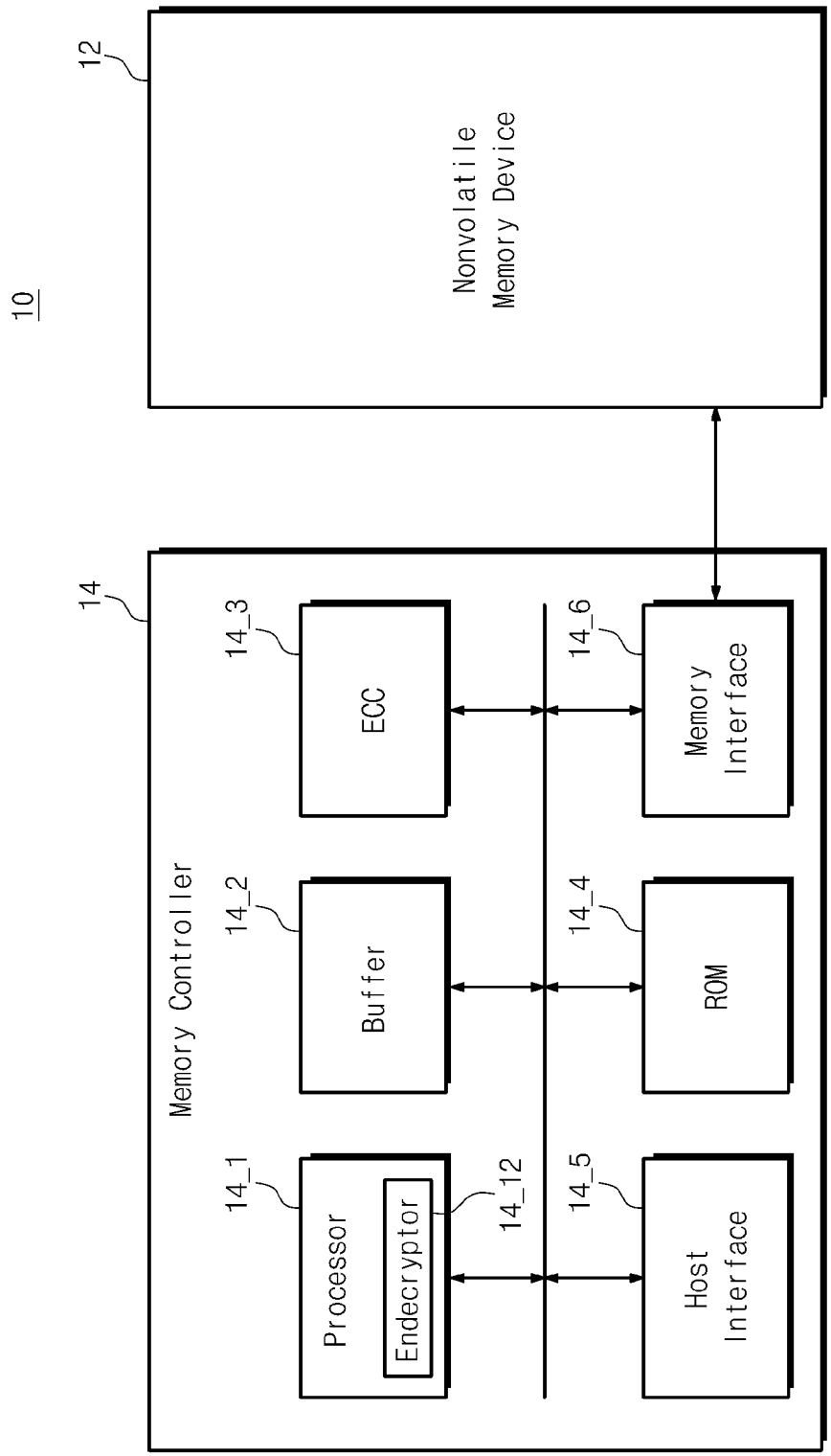
FIG. 12 is a block diagram of a memory system according to an embodiment of the present inventive concept.

FIG. 12 is a block diagram of a memory system 10 according to an embodiment of the present inventive concept. As illustrated, the memory system 10 may include a nonvolatile memory device 12 and a memory controller 14.

The nonvolatile memory device 12 may be configured using a NOR flash memory, a resistive random access memory (RRAM), a phase-change memory (PRAM), magnetoresistive random access memory (MRAM), ferroelectric random access memory (FRAM), a spin transfer torque random access memory (STT-RAM), and so forth.

The memory controller 14 may control the nonvolatile memory device 12 at the request of an external entity, e.g., a host. For instance, the memory controller 14 may be configured to control a program/read/erase operation of the nonvolatile memory device 12.

The memory controller 14 may provide an interface between the nonvolatile memory device 12 and the host. The memory controller 14 may be configured to drive firmware for controlling the nonvolatile memory device 12. The memory controller 14 may include a central processing unit (CPU) 14_1, a buffer 142, an error correction circuit (ECC) 14_3, a read-only memory (ROM) 14_4, a host interface 14_5, and a memory interface 14_6.

The CPU 14_1 may control the overall operation of the memory controller 14. The CPU 14_1 according to the present inventive concept may include an endecryptor 14_12, which may be organized with the same structure and function as the endecryptor 100 shown in FIG. 1.

The buffer 14_2 may be used as a working memory of the CPU 14_1. At the write request of the host, data received from the host may be temporarily stored in the buffer 14_2. Also, at the read request of the host, data read from the nonvolatile memory device 12 may be temporarily stored in the buffer 142.

At the write request, the ECC 14_3 may use an error correction code to decode data stored in the buffer 14_2. The decoded data and a value of the error correction code may be stored in the nonvolatile memory device 12. At the read request, the ECC 14_3 may use an error correction code value to recover data read out of the nonvolatile memory device 12. The error correction code value may be included in the read-out data.

The ROM 14_4 may store data used to drive the memory controller 14.

The host interface 14_5 may include a protocol for data exchange between the host and the memory controller 14. For instance, the memory controller 14 may be configured to communicate with an external entity (host) through one of various interface protocols such as Universal Serial Bus (USB), Multimedia Card (MMC), Peripheral Component Interconnection (PCI), PCI-Express (PCI-E), Advanced Technology Attachment (ATA), Serial-ATA, Parallel-ATA, Small Computer Small Interface (SCSI), Enhanced Small Disk Interface (ESDI), and Integrated Drive Electronics (IDE).

The memory interface 14_6 may be configured to provide the interface between the nonvolatile memory device 12 and the memory controller 14.

The endecryptor 14_12 shown in FIG. 12 may be configured to be disposed inside the CPU 14_1. However, the present inventive concept is not limited thereto. An endecryptor according to the present inventive concept may be provided as a separate processor.

Figure 13:
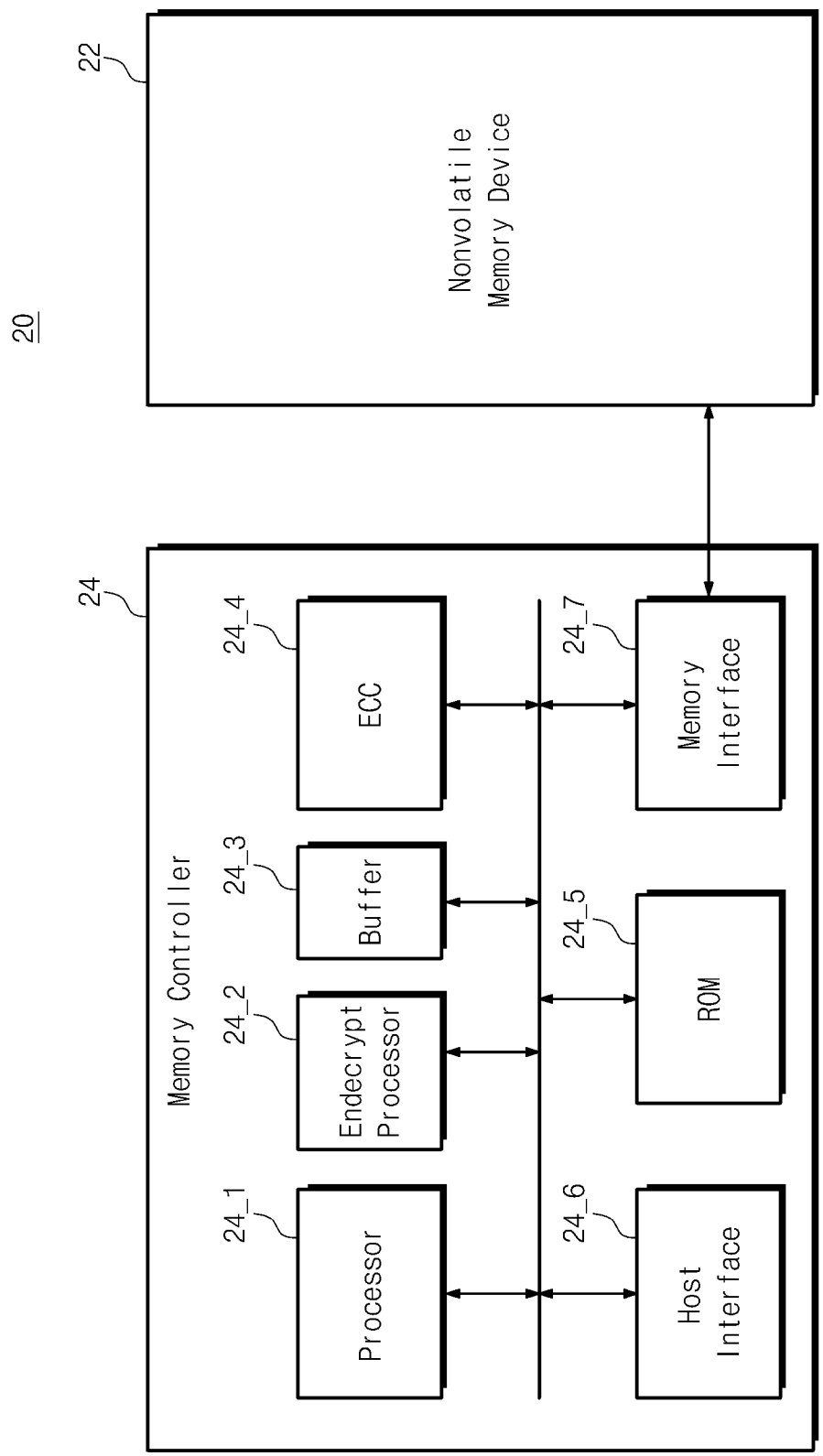
FIG. 13 is a block diagram of a memory system according to another embodiment of the present inventive concept.

FIG. 13 is a block diagram of a memory system 20 according to another embodiment of the present inventive concept. As illustrated, the memory system 20 may include a nonvolatile memory device 22 and a memory controller 24. The memory controller 24 may include an endecryption processor 24_2, which may be organized with the same structure as the endecryptor 100 shown in FIG. 1.

The nonvolatile memory device 22 may be configured using a NOR flash memory, a resistive random access memory (RRAM), a phase-change memory (PRAM), magnetoresistive random access memory (MRAM), ferroelectric random access memory (FRAM), a spin transfer torque random access memory (STT-RAM), and so forth.

The memory controller 24 may control the nonvolatile memory device 22 at the request of an external entity, e.g., a host. For instance, the memory controller 24 may be configured to control a program/read/erase operation of the nonvolatile memory device 22.

The memory controller 24 may provide an interface between the nonvolatile memory device 22 and the host. The memory controller 24 may be configured to drive firmware for controlling the nonvolatile memory device 22. The memory controller 24 may include a central processing unit (CPU) or processor 24_1, a buffer 24_3, an error correction circuit (ECC) 24_4, a read-only memory (ROM) 24_5, a host interface 24_6, a memory interface 24_7, and a separate endecryption processor 24_2.

The processor 24_1 may control the overall operation of the memory controller 24. According to the present inventive concept, the endecryption processor 24_2 may be organized with the same structure and function as the endecryptor 100 shown in FIG. 1.

The buffer 24_3 may be used as a working memory of the processor 24_1. At the write request of the host, data received from the host may be temporarily stored in the buffer 24_3. Also, at the read request of the host, data read from the nonvolatile memory device 22 may be temporarily stored in the buffer 24_3.

At the write request, the ECC 24_4 may use an error correction code to decode data stored in the buffer 24_3. The decoded data and a value of the error correction code may be stored in the nonvolatile memory device 22. At the read request, the ECC 24_4 may use an error correction code value to recover data read out of the nonvolatile memory device 22. The error correction code value may be included in the read-out data.

The ROM 24_5 may store data used to drive the memory controller 24.

The host interface 24_6 may include a protocol for data exchange between the host and the memory controller 24. For instance, the memory controller 24 may be configured to communicate with an external entity (host) through one of various interface protocols such as Universal Serial Bus (USB), Multimedia Card (MMC), Peripheral Component Interconnection (PCI), PCI-Express (PCI-E), Advanced Technology Attachment (ATA), Serial-ATA, Parallel-ATA, Small Computer Small Interface (SCSI), Enhanced Small Disk Interface (ESDI), and Integrated Drive Electronics (IDE).

The memory interface 24_7 may be configured to provide the interface between the nonvolatile memory device 22 and the memory controller 24.

In contrast to the embodiment described above in connection with FIG. 12, the endecryptor 24_2 shown in FIG. 13 may be configured to be disposed separately from the processor 24_1.

Figure 14:
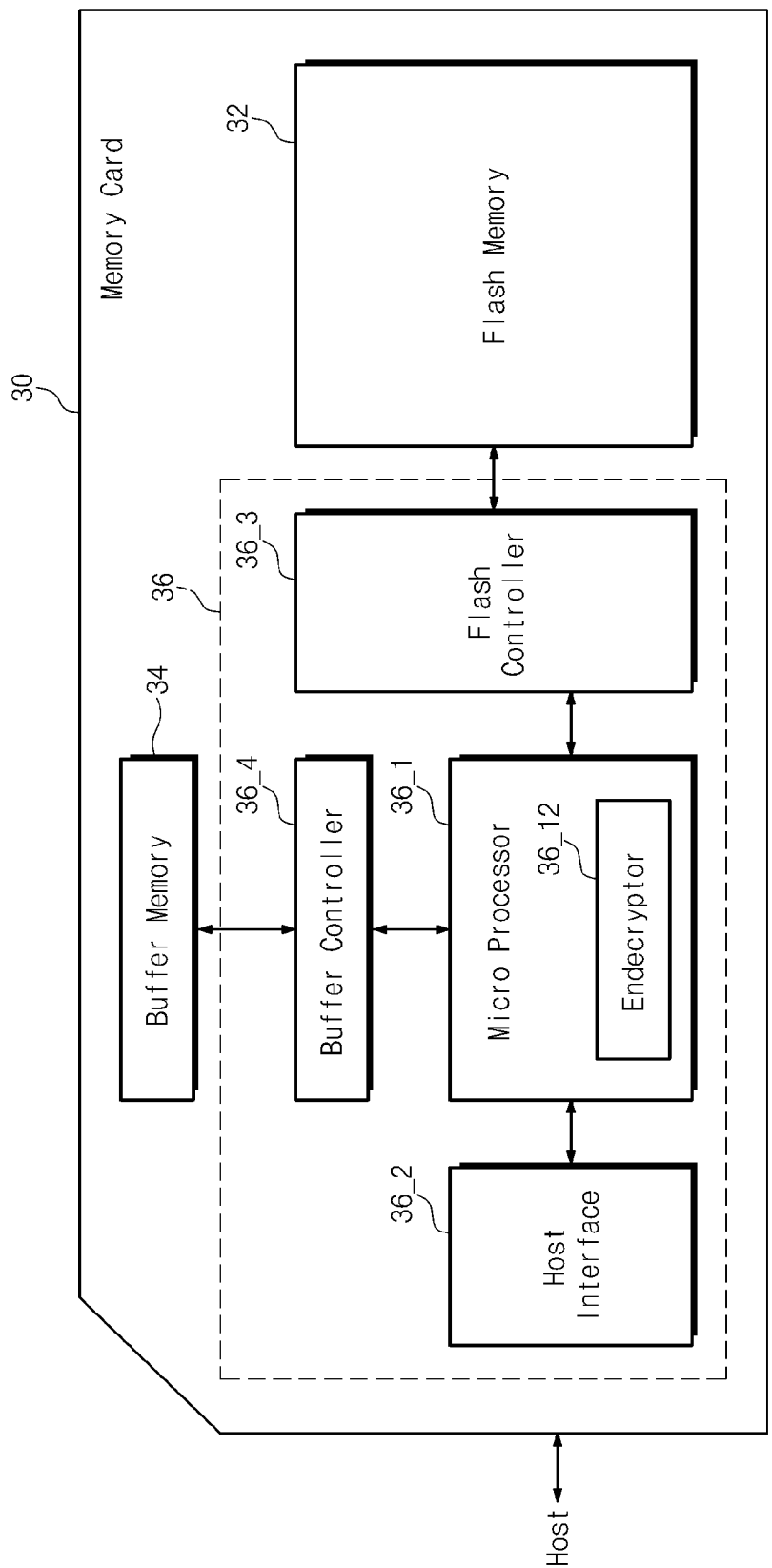
FIG. 14 is a block diagram of a memory card according to an embodiment of the present inventive concept.

FIG. 14 is a block diagram of a memory card 30 according to an embodiment of the present inventive concept. As illustrated, the memory card 30 may include a flash memory 32, a buffer memory 34, and a memory controller 36 configured to control the flash memory 32 and the buffer memory 34.

The flash memory 32 may be a NAND flash memory or a NOR flash memory.

The buffer memory 34 is a device for temporarily storing data generated during an operation of the memory card 30. The buffer memory 34 may be configured using a DRAM or an SRAM.

The memory controller 36 may be coupled between a host and the flash memory 32. The memory controller 36 may be configured to access the flash memory 32 in response to the request of the host.

The memory controller 36 may include a microprocessor 36_1, a host interface 36_2, a flash controller 36_3, and a buffer controller 36_4. The memory controller 36 may be configured to drive firmware for controlling the flash memory device 32.

The microprocessor 36_1 may include an endecryptor 36_12, which may be organized with the same structure and function as the endecryptor 100 shown in FIG. 1.

The host interface 36_2 may interface with a host through a card, e.g., MMC, protocol for data exchange between the host and the memory controllers 36_3 and 36_4.

The memory card 30 may be applied to Multimedia Card (MMC), Security Digital (SD), Memory Stick, SmartMedia, and TransFlash Card.

Figure 15:
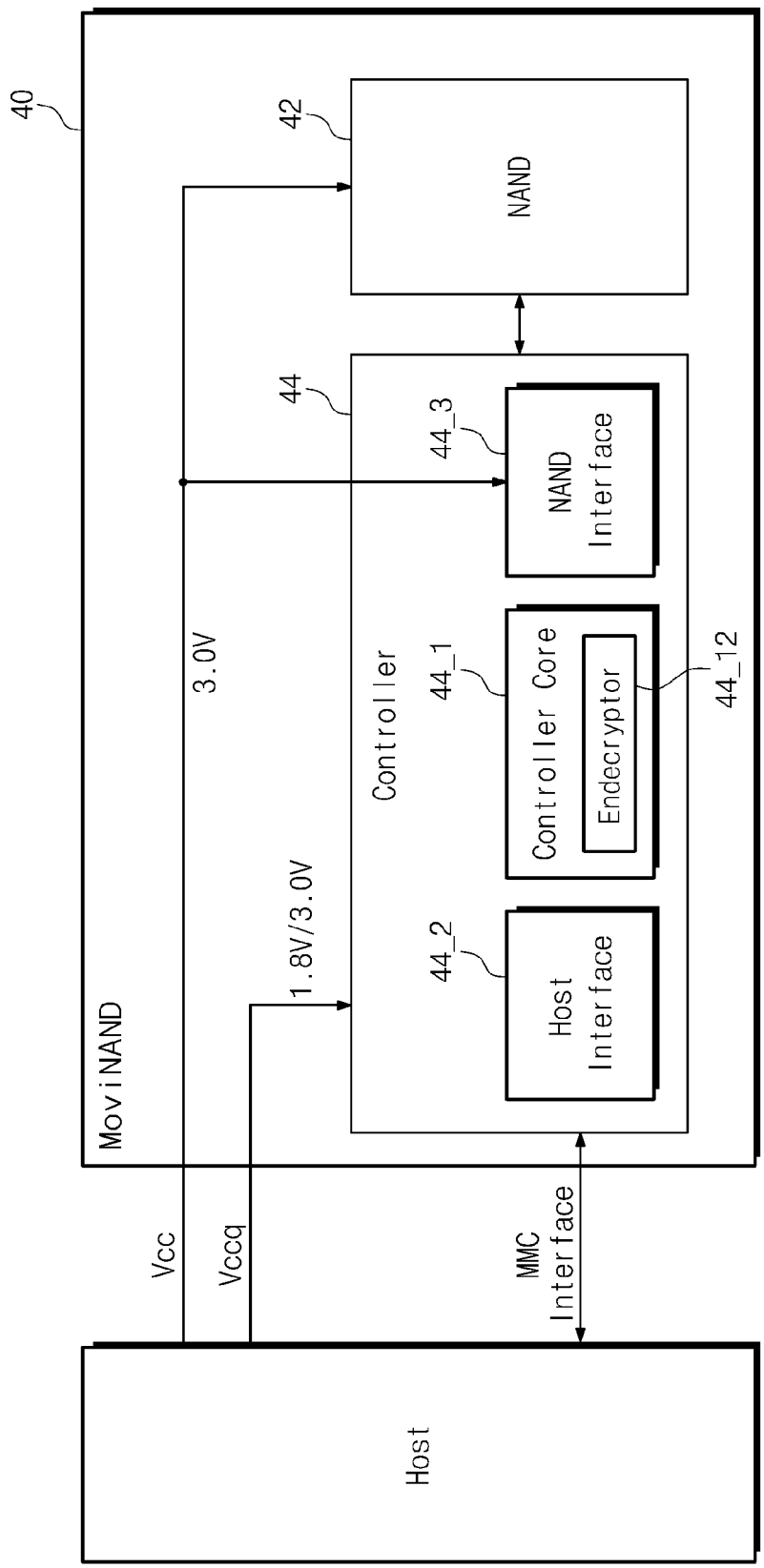
FIG. 15 is a block diagram of a moviNAND device according to the present inventive concept.

FIG. 15 is a block diagram of a moviNAND device 40 according to the present inventive concept. As illustrated, the moviNAND device 40 may include a NAND flash memory device 42 and a controller 44.

The NAND flash memory device 42 may be configured by stacking unitary NAND flash memories in a package, e.g., a Fine-pitch Ball Grid Array (FBGA) package. Each of the unitary NAND flash memories may be organized with the same structure and function as any of such memories.

The controller 44 may include a controller core 44_1, a host interface 44_2, and a NAND interface 44_3. The controller core 44_1 may control the overall operation of the moviNAND memory 40. The controller core 44_1 may include an endecryptor 44_12, which may be organized with the same structure and function as the endecryptor 100 shown in FIG. 1.

The host interface 44_2 may provide the interface between the controller 44 and a multimedia card (MMC) of a host. The NAND interface 44_3 may provide the interface between the NAND flash memory device 42 and the controller 44.

The moviNAND device 40 may receive power supply voltages Vcc and Vccq from the host. The power supply voltage Vcc (about 3V) may be supplied to the NAND flash memory device 42 and the NAND interface 44_3, while the power supply voltage Vccq (about 1.8V/3V) may be supplied to the controller 44.

The inventive concept may be applied to a solid state drive (SSD).

Figure 16:
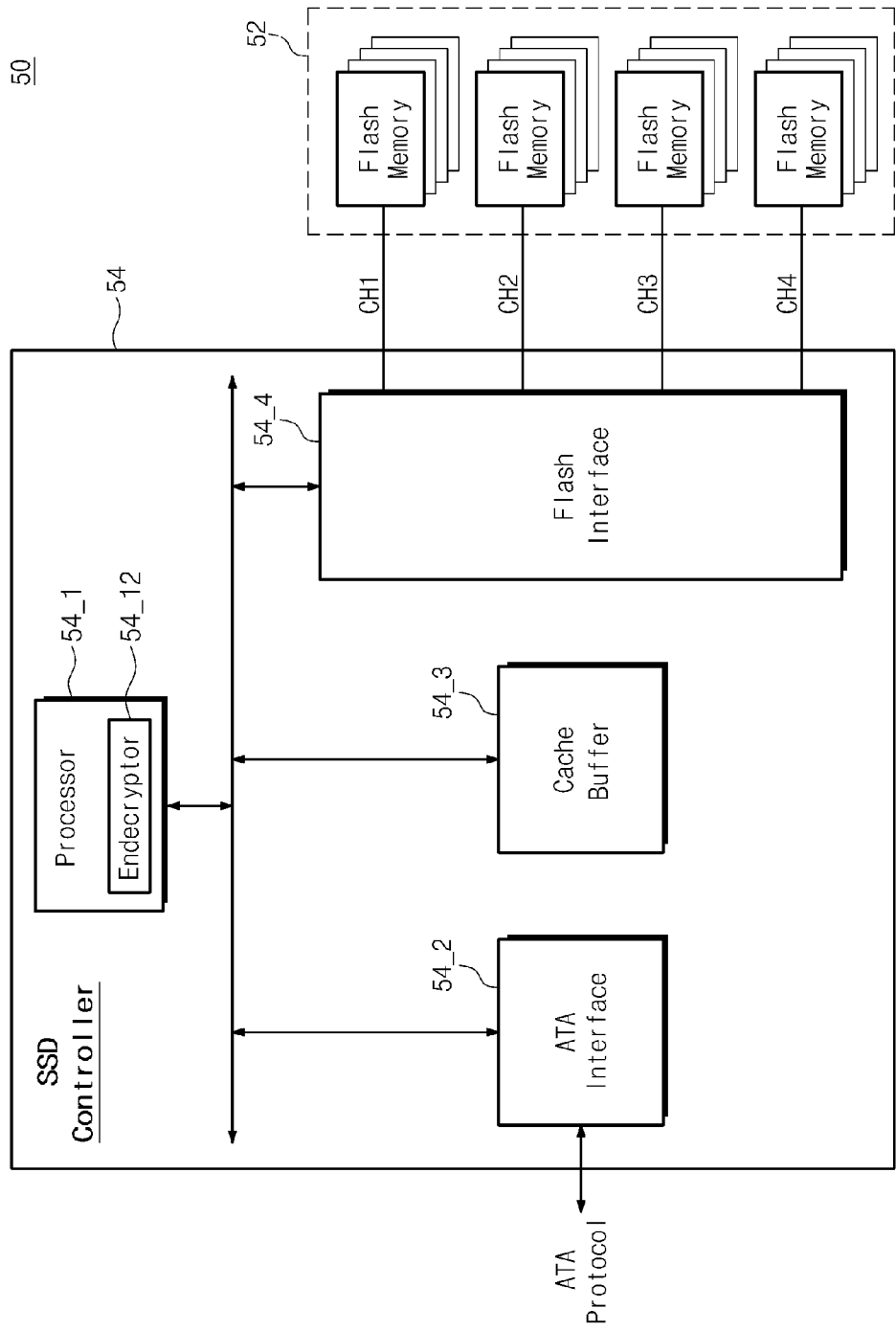
FIG. 16 is a block diagram of an SSD according to the present inventive concept.

FIG. 16 is a block diagram of an SSD 50 according to the present inventive concept. As illustrated, the SSD 50 may include a plurality of flash memory devices 52 and an SSD controller 54.

Each of the flash memory devices 52 may be configured using a NAND flash.

The SSD controller 54 may include a CPU 54_1, a host interface 54_2, a cache buffer 54_3, and a flash interface 54_4.

The CPU 54_1 may include an endecryptor 54_12, which may be organized with the same structure and function as the endecryptor 100 shown in FIG. 1.

Under the control of the CPU 54_1, the host interface 54_2 exchanges data with a host through, for example, ATA protocol. The host interface 54_2 may be one of a Serial Advanced Technology Attachment (SATA) interface, a Parallel Advanced Technology Attachment (PATA) interface, and an External SATA (ESATA) interface.

Data to be received/transmitted from/to the host through the host interface 54_2 may be transferred through the cache buffer 54_3 without bypassing a CPU bus, under the control of the CPU 54_1.

The cache buffer 54_3 may temporarily store data transmitted between an external entity and the flash memory devices 52. The cache buffer 54_3 may be used to store programs to be executed by the CPU 54_1. The cache buffer 54_3 may be regarded as a kind of buffer memory and may be configured using an SRAM.

The flash interface 54_4 may provide the interface between the SSD controller 54 and the flash memory devices 52 used as storage devices. The flash interface 54_4 may be configured to support NAND flash memories, One-NAND flash memories, multi-level flash memories, or single-level flash memories.

Figure 17:
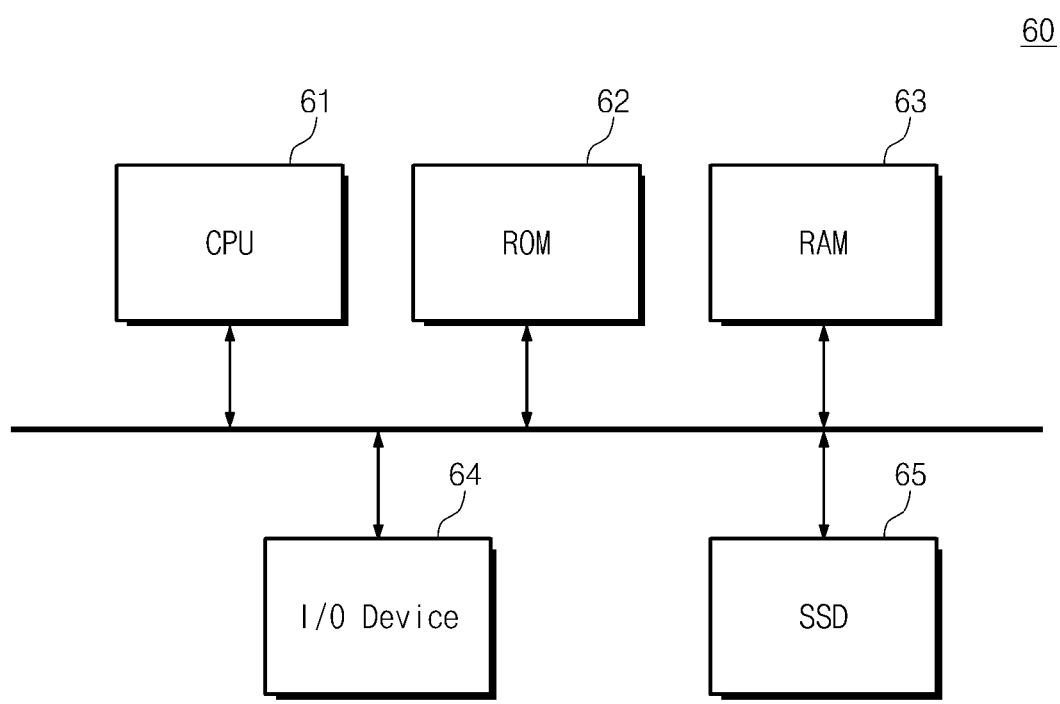
FIG. 17 is a block diagram of a computing system including an SSD according to the present inventive concept.

FIG. 17 is a block diagram of a computing system 60 according to an embodiment of the present inventive concept. As illustrated, the computing system 60 may include a CPU 61, a ROM 62, a RAM 63, an input/output (I/O) device 64, and an SSD 65.

The CPU 61 may be connected to a system bus. The ROM 62 may store data used to drive the computing system 60. The data may include a start command sequence or a basic I/O system (BIOS) sequence. The RAM 63 may temporarily store data generated when the CPU 61 operates.

The I/O device 64 may be connected to the system bus through an I/O device interface. Examples of the I/O device 64 may include a keyboard, a pointing device (mouse), a monitor, and a modem.

The SSD 65 is a readable storage device and may be organized with the same structure and function as the SSD 50 shown in FIG. 16.

Figure 18:
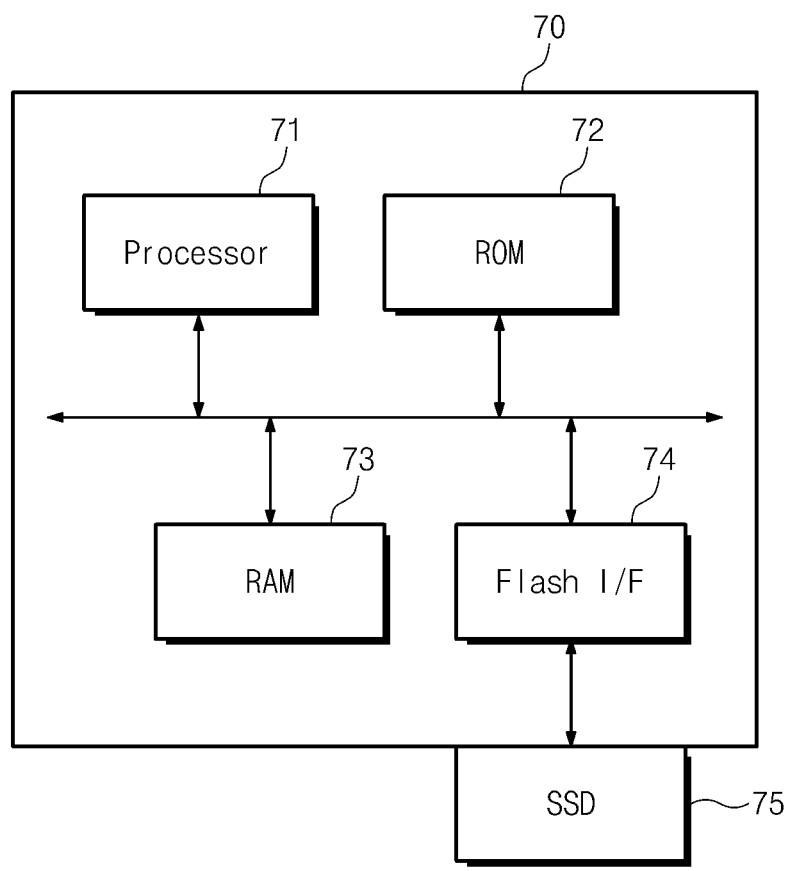
FIG. 18 illustrates an electronic device including an SSD according to the present inventive concept.

FIG. 18 illustrates an electronic device 70 according to an embodiment of the present inventive concept. As illustrated, the electronic device 70 may include a processor 71, a ROM 72, a RAM 73, a flash interface (I/F) 74, and an SSD 75.

The processor 71 may access the RAM 73 to execute firmware codes or other codes. Also, the processor 71 may access the ROM 72 to execute fixed command sequences such as a start command sequence and basic I/O system (BIOS) sequences. The flash interface (I/F) 74 may provide the interface between the electronic device 70 and the SSD 75.

The SSD 75 is detachable from the electronic device 70. The SSD 75 may be organized with the same structure and function as the SSD 50 shown in FIG. 16.

Examples of the electronic device 70 may include cellular phones, personal digital assistants (PDAs), digital cameras, camcorders, portable audio players (e.g., MP3 players), and portable media players (PMPs).

Figure 19:
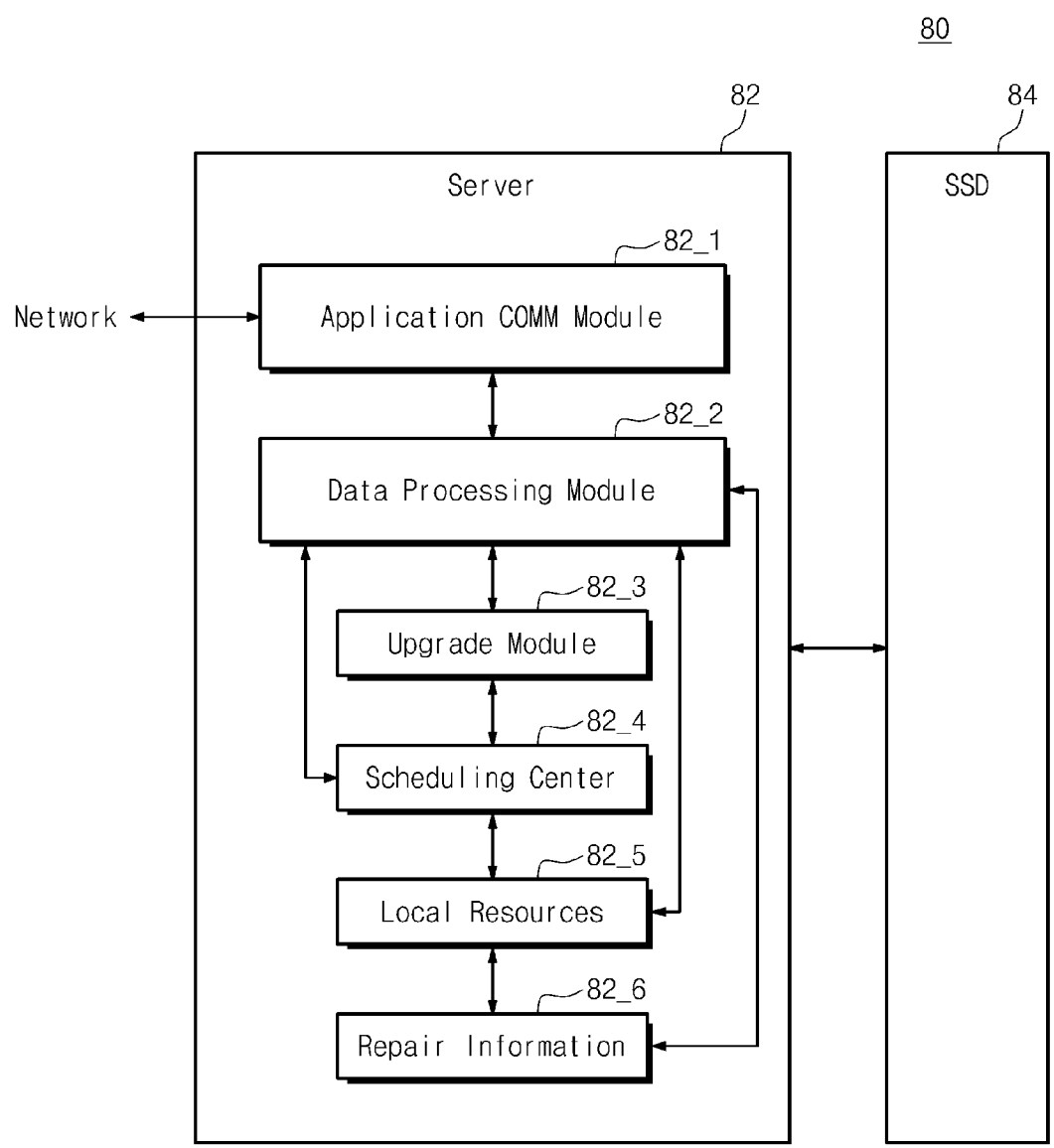
FIG. 19 illustrates a server system including an SSD according to the present inventive concept.

FIG. 19 illustrates a server system 80 according to an embodiment of the present inventive concept. As illustrated, the server system 80 may include a server 82 and an SSD 84 storing data used to drive the server 82. The SSD 84 may be organized with the same structure and function as the SSD 50 in FIG. 16.

The server 82 may include an application communication module 82_1, a data processing module 82_2, an upgrade module 82_3, a scheduling center 82_4, a local resource module 82_5, and a repair information module 82_6.

The application communication module 82_1 may be configured to communicate with a computing system connected to the server 82 through a network or to provide communication between the server 82 and the SSD 84. The application communication module 82_1 may transmit information or data, provided through a user interface, to the data processing module 82_2.

The data processing module 82_2 may be linked to the local resource module 82_5. The local resource module 82_5 may provide a list of repair shops/dealers/technical information to a user, based on information or data input to the server 82.

The upgrade module 82_3 may interface with the data processing module 82_2. Based on information or data received from the SSD 84, the upgrade module 82_3 may upgrade firmware, a reset code, a diagnosis system or upgrade other information to electronic appliances.

The scheduling center 82_4 may allow real-time options to the user, based on information or data input to the server 82.

The repair information module 82_6 may interface with the data processing module 822. The repair information module 82_6 may be used to provide repair-related information, e.g., audio, video or text files, to the user. The data processing module 82_2 may package related information, based on information received from the SSD 84. The packaged information may be transmitted to the SSD 84 or be displayed to the user.

A memory system or a storage device according to embodiments of the present inventive concept may be packaged using various types of packages. For instance, a memory system or a storage device according to embodiments of the present inventive concept may be packaged using packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

While the present inventive concept has been described with reference to exemplary embodiments, it will be apparent to those skilled in the art that various changes and modifications may be made without departing from the spirit and scope of the present inventive concept. Therefore, it should be understood that the above embodiments are not limiting, but illustrative. Thus, the scope of the present inventive concept is to be determined by the broadest permissible interpretation of the following claims and their equivalents, and shall not be restricted or limited by the foregoing description.

What is claimed is:

1. An encryption/decryption method of an endecryptor, comprising:

dividing, by a computing device, an input data stream into a plurality of consecutive, non-overlapping, data units;

inputting the divided consecutive, non-overlapping, data units to respective endecryption units, each supporting an XOR-encrypt-XOR (XEX) encryption mode with tweak and ciphertext stealing (XTS); and simultaneously processing the input data units at the respective endecryption units, wherein simultaneously processing the input data units at the respective endecryption units comprises:

encrypting a tweak value according to a second input key and the block cipher protocol;

performing modular multiplication of the encrypted tweak value by a primitive value;

performing an exclusive OR (XOR) operation on a result value of the modular multiplication and an input data unit;

processing a result value of the XOR operation according to a first input key and the block cipher protocol; and performing an XOR operation on the result value of the modular multiplication and the processed result value of the XOR operation and wherein the primitive value is determined by an exponent corresponding to the sequential number of the consecutive data units.

2. The encryption/decryption method as set forth in claim 1, wherein the endecryption units receive data units of a predetermined size.

3. The encryption/decryption method as set forth in claim 2, wherein a last data unit and a data unit preceding the last data unit among the consecutive data units are encrypted/decrypted using ciphertext stealing (CTS) when the data stream cannot be divided evenly by the predetermined size.

4. The encryption/decryption method as set forth in claim 3, wherein when the CTS occurs, the last data unit is input to an encryption unit at which the data unit preceding the last data unit is processed.

5. The encryption/decryption method as set forth in claim 1, wherein the endecryptor inputs the consecutive data units to the endecryption units in a parallel processing mode, respectively.

6. The encryption/decryption method as set forth in claim 1, wherein the endecryptor inputs the consecutive data units to one of the endecryption units in a mode that is not a parallel processing mode.

7. The encryption/decryption method as set forth in claim 1, wherein each of the endecryption units uses a block cipher protocol.

8. The encryption/decryption method as set forth in claim 7, wherein the block cipher protocol is the advanced encryption standard (AES) protocol.

9. The encryption/decryption method as set forth in claim 8, wherein the tweak value is any bit having the same size as data to be processed at the endecryption units.

10. The encryption/decryption method as set forth in claim 8, wherein the modular multiplication of the primitive value is performed by a shift or XOR operation.

11. An endecryptor comprising:
a plurality of endecryption units supporting XTS encryption;
a divider to divide a data stream into consecutive, non-overlapping, data units; and
an allocator to allocate the divided data units to the endecryption units, respectively, and to input the allocated data units to the endecryption units,
wherein each of the endecryption units simultaneously processes the input data units,
wherein simultaneously processing the input data units at the respective endecryption units comprises:
encypting a tweak value according to a second input key and the block cipher protocol;
performing modular multiplication of the encrypted tweak value by a primitive value;
performing an exclusive OR (XOR) operation on a result value of the modular multiplication and an input data unit;
processing a result value of the XOR operation according to a first input key and the block cipher protocol; and
performing an XOR operation on the result value of the modular multiplication and the processed result value of the XOR operation, and wherein the primitive value is determined by an exponent corresponding to the sequential number of the consecutive data units.

12. The endecryptor as set forth in claim 11, wherein the allocator simultaneously inputs the allocated data units to the endecryption units during one processing period in a parallel processing mode.

13. The endecryptor as set forth in claim 11, wherein each of the endecryption units performs an endecryption operation according to a block cipher protocol by the unit of 128 bits.

14. The endecryptor as set forth in claim 13, wherein a remainder obtained by dividing bytes of the data stream by 16 is used to determine whether ciphertext stealing (CTS) occurs.

15. The endecryptor as set forth in claim 13, wherein a value obtained by dividing bytes of the data stream by 16 is subjected to a floor operation when ciphertext stealing (CTS) does not occur, and a remainder obtained by dividing a value obtained by subtracting 1 from a value obtained through the floor operation by the number of the endecryption units is used to determine an endecryption unit where the last one of the consecutive data units is to be processed.

16. The endecryptor as set forth in claim 15, wherein when the CTS does not occur, a value obtained by dividing the bytes of the data stream by a value obtained by multiplying the number of the endecryption units by 16 is subjected to a ceiling operation to determine a parallel processing count of the endecryption units.

17. The endecryptor as set forth in claim 13, wherein when the CTS occurs, a value obtained by dividing a value obtained by subtracting 16 from bytes of the data stream by a value obtained by multiplying the number of the endecryption units by 16 is used to determine a parallel processing count of the endecryption units.

18. The endecryptor as set forth in claim 13, wherein the block cipher protocol is the advanced encryption standard (AES) protocol.

* * * * *